(12) United States Patent
Palmisano et al.

(10) Patent No.: US 12,545,966 B2
(45) Date of Patent: Feb. 10, 2026

(54) METHODS FOR DETECTING FUNGI IN TURF GRASS WITH A LAMP ASSAY HAVING NOVEL PRIMER SETS

(71) Applicant: SYNGENTA CROP PROTECTION AG, Basel (CH)

(72) Inventors: Marilena Palmisano, Wädenswil (CH); Christian Wohler, Wädenswil (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 0 days.

(21) Appl. No.: 18/185,738

(22) Filed: Mar. 17, 2023

(65) Prior Publication Data

US 2023/0340621 A1    Oct. 26, 2023

Related U.S. Application Data

(62) Division of application No. 16/967,319, filed as application No. PCT/EP2019/052803 on Feb. 5, 2019, now Pat. No. 11,634,783.

(30) Foreign Application Priority Data

Feb. 5, 2018  (EP) .................................. 18155093
Mar. 2, 2018  (EP) .................................. 18159821

(51) Int. Cl.
*C12Q 1/68*       (2018.01)
*C12Q 1/6895*     (2018.01)

(52) U.S. Cl.
CPC ........ *C12Q 1/6895* (2013.01); *C12Q 2600/16* (2013.01)

(58) Field of Classification Search
None
See application file for complete search history.

(56) References Cited

U.S. PATENT DOCUMENTS 5,827,695 A     10/1998   Beck
2013/0116344 A1  5/2013   Di Maiuta

FOREIGN PATENT DOCUMENTS

| CN | 101415327 A | 4/2009 |
| CN | 104946760 B | 9/2015 |
| CN | 106222263 A | 12/2016 |
| CN | 108060257 A | 5/2018 |
| WO | 2009147017 A1 | 12/2009 |
| WO | 2015067635 A2 | 5/2015 |

OTHER PUBLICATIONS

Genbank Accession No. AJ238712—*Rhizoctonia solani* 5.8S rRNA gene and internal transcribed spacer 1 (ITS1) and internal transcribed spacer 2 (ITS2), submitted Oct. 15, 2008, retrieved on Jan. 21, 2025 from http://www.ncbi.nlm.nih.gov/nuccore/AJ238712). (Year: 2008).*
Genbank Accession No. FJ392712—*Rhizoctonia solani* isolate CSL1931 beta-tubulin gene, partial cds, submitted Apr. 9, 1999, retrieved on Jan. 21, 2025 from http://www.ncbi.nlm.nih.gov/nuccore/FJ392712). (Year: 1999).*
Genbank Accession No. HQ908656—*Rhizoctonia solani* isolate 4576 beta tubulin gene, partial sequence, submitted Jan. 17, 2011, retrieved on Jan. 21, 2025 from http://www.ncbi.nlm.nih.gov/nuccore/ HQ908656). (Year: 2011).*
Lu et al., 2015. Rapid diagnosis of soybean seedling blight caused by Rhizoctonia solani and soybean charcoal rot caused by Macrophomina phaseolina using LAMP assays. Phytopathology, 105(12), pp. 1612-1617. (Year: 2015).*
Patel et al., 2015. Implementation of loop-mediated isothermal amplification methods in lateral flow devices for the detection of Rhizoctonia solani. Canadian journal of plant pathology, 37(1), pp. 118-129. (Year: 2015).*
Fukuta et al., 2013. Detection of Pythium aphanidermatum in tomato using loop-mediated isothermal amplification (LAMP) with species-specific primers. European journal of plant pathology, 136(4), pp. 689-701. (Year: 2013).*
Nagamine et al., 2002. Accelerated reaction by loop-mediated isothermal amplification using loop primers. Molecular and cellular probes, 16(3), pp. 223-229. (Year: 2002).*
Notomi et al., 2000. Loop-mediated isothermal amplification of DNA. Nucleic acids research, 28(12), e63—pp. 1-7. (Year: 2000).*
Ahmed et al.: Discriminatory Simplex and Multiplex PCR for Four Species of the Genus *Sclerotinia*; Journal of Microbiological Methods, Elsevier, Amsterdam, NI vol. 92 (3), pp. 293-300; 2012.
Asano et al., 2010. Development of multiplex PCR to detect five Pythium species related to turfgrass diseases. Journal of phytopathology, 158(9), pp. 609-615. (Year: 2010).
Cao et al., 2016. Rapid and quantitative detection of Pythium inflatum by real-time fluorescence loop-mediated isothermal amplification assay. European Journal of Plant Pathology, 144(1), pp. 83-95. (Year: 2016).
Chenchen Lu et al.: Rapid Diagnosis of Soybean Seedling Blight Caused by Rhizoctonia Solani and Soybean Charcoal Rot Caused by Macrophomina Phaseolina Using Lamp Assays; Phytopathology, vol. 105 (12), pp. 1612-1617; 2015.

(Continued)

*Primary Examiner* — Gary Benzion
*Assistant Examiner* — Olayinka A Oyeyemi
(74) *Attorney, Agent, or Firm* — BakerHostetler; Toni-Junell Herbert

(57) ABSTRACT

The present invention provides a method for detecting fungal DNA in a turf grass sample with a loop-mediated isothermal amplification (LAMP) assay which contains primers for fungal DNA of at least one turf pathogenic fungi selected from *Sclerotinia homoeocarpa*, *Rhizoctonia solani* spp., *Pythium aphanidermatum*, *Gaeumannomyces graminis* spp., *Microdochium nivale* spp., *Magnaporthe poae*, *Colletotrichum graminicola*, *Colletotrichum cereale* and *Pythium ultimum* var. *ultimum*, comprising: subjecting the turf sample to a LAMP reaction wherein the LAMP reaction uses a primer set of four or more nucleic acid sequences with each primer in the set having from 15 to 50 nucleic acids The primers useful in the present method are selected from specifically selected internal transcribed spacer regions or genes of the target fungi to provide improved assay results.

13 Claims, No Drawings
Specification includes a Sequence Listing.

(56) References Cited

OTHER PUBLICATIONS

Denschlag et al., 2014. Real-time loop-mediated isothermal amplification (LAMP) assay for group specific detection of important trichothecene producing *Fusarium* species in wheat. International journal of food microbiology, 177, pp. 117-127. (Year: 2014).

Devries et al.: Genetic Analysis of Fungicide-Resistant Sclerotinia Homoeocarpa Isolates From Tennessee and Northern Mississippi; Plant Disease, vol. 92 (1), pp. 83-90; 2008.

English translation of CN104946760B, published Dec. 8, 2017. (Year: 2017).

English translation of CN106222263A, published Dec. 14, 2016. (Year: 2016).

English translation of CN108060257A, published May 22, 2018. (Year: 2018).

Fukuta et al., Epub Dec. 15, 2016. Detection of Fomitiporia torreyae and Fulviformes umbrinellus by multiplex loop-mediated isothermal amplification (mLAMP) for diagnosis of Japanese pear dwarf. Annals of Applied Biology, 2017, 170(2), pp. 170-178. (Year: 2016).

Fukuta Shiro et al.: Detection of Pythium Aphanidermatum in Tomato Using Loop-Mediated Isothermal Amplification (Lamp) With Species-Specific Primers; European Journal of Plant Pathology, Springer Netherlands, NI, vol. 136 (4), pp. 689-701; 2013.

Genbank Accession No. AB513047—*Pythium ultimum* var. *ultimum* gene for 28S rRNA, partial sequence, strain: NBRC 100122, submitted Jul. 2012, retrieved on Mar. 30, 2022 from http://www.nobi.nim.nih.gov/nuccore/AB513047). (Year: 2012).

Genbank Accession No. DQ448301—*Sclerotinia homoeocarpa* elongation factor-1 alpha gene, partial sequence, submitted by Mar. 15, 2006, retrieved on Jun. 14, 2022 from (Year: 2006).

International Search Report and Written Opinion for International Application No. PCT/EP2019/052803 mailed Jul. 3, 2019.

Partial International Search Report of International Application No. PCT/EP2019/052803 mailed Mar. 29, 2019.

Patel et al.: Implementation of Loop-Mediated Isothermal Amplification Methods in Lateral Flow Devices for the Detection of Rhizoctonia Solani; Canadian Journal of Plant Pathology, vol. 37 (1); pp. 118-119; 2015.

Shen Danyu et al.: Development of a Loop-Mediated Isothermal Amplification Method for the Rapid Detection of Pythium Ultimum; Australasian Plant Pathology, Adelaide, Au, vol. 46 6), pp. 571-576; 2017.

Tanner, N.A., Zhang, Y. and Evans Jr, T.C., 2012. Simultaneous multiple target detection in real-time loop-mediated isothermal amplification. Biotechniques, 53(2), pp. 81-89. (Year: 2012).

McCartney, et al., "Molecular Diagnostics for Fungal Plant Pathogens," Pest Management Science, 2003, vol. 59, pp. 129-142, XP002367388.

Nicholson, et al., "Development of a PCR assay to identify and quantify Microdochium nivale var. nivale and Microdochium nivale var. majus in wheat," Physiological and Molecular Plant Pathology, 1996, vol. 48, pp. 257-271.

Extended European Search Report for European Application No. 24151938.8, mailed Oct. 28, 2024, 25 Pages.

* cited by examiner

METHODS FOR DETECTING FUNGI IN TURF GRASS WITH A LAMP ASSAY HAVING NOVEL PRIMER SETS

CROSS-REFERENCE TO RELATED APPLICATIONS

This application is a divisional of U.S. application Ser. No. 16/967,319, filed Aug. 4, 2020, which is a 371 National Stage application of International Application No. PCT/EP2019/052803, filed Feb. 5, 2019, which claims priority to EP 18159821.0, filed Mar. 2, 2018, and EP 18155093.0, filed Feb. 5, 2018, the entire contents of which are incorporated by reference herein.

REFERENCE TO ELECTRONIC SEQUENCE LISTING

The application contains a Sequence Listing which has been submitted electronically in .XML format and is hereby incorporated by reference in its entirety. Said .XML copy, created on Jul. 7, 2023, is named "115479.000720.xml" and is 122,491 bytes in size. The sequence listing contained in this .XML file is part of the specification and is hereby incorporated by reference herein in its entirety.

The present invention relates to a method of detecting diseases in turf grass caused by fungal pathogens with a loop-mediated isothermal amplification (LAMP) assay of a sample of such turf grass to detect nucleic acids from one or more fungi.

LAMP or Loop-mediated Isothermal Amplification as described in e.g. U.S. Pat. No. 6,410,278 (Eiken) is a DNA amplification method characterized by the use of at least 4 or more different primers that are specifically designed to recognize 6 distinct regions on the target gene and the reaction process proceeds at a constant temperature using strand displacement reaction. Amplification and detection of target nucleic acid of interest can be completed in a single step, by incubating the mixture of the biological sample or a nucleic acid extract thereof, primers, DNA polymerase with strand displacement activity and substrates at a constant temperature (about 65° C.). It provides high amplification efficiency, with DNA being amplified numerous times in 15-60 minutes. Because of its high specificity, the presence of amplified product can indicate the presence of target gene.

There are numerous problems that turf grass managers face in maintaining turf grass at a standard of quality expected by users. While the problems are many, those relating to disease (including diseases caused by fungal pathogens) are particularly challenging to manage and control. For example, disease can affect turf grass plants on golf courses causing a loss of revenue from reduced quality including playability. One example of a common problem for golf course managers is knowing which disease is present so that appropriate and timely management techniques can be taken. Relevant turf diseases caused by turf pathogenic microorganisms include, for example, anthracnose, take-all patch, summer patch, snow mold, *pythium* blight, brown patch and dollar spot.

Agricultural active chemicals for controlling pathogens, such as fungicides, are typically applied on golf courses as needed depending on the extent of disease pressure, pathogen population, weather, and the like. However, fungicide applications are highly controlled by course budget, availability of appropriate equipment, and availability of qualified personnel for applying the agricultural active chemicals.

In view of these problems, a rapid and reliable assay for detection of turf pathogenic fungi would be extremely useful. Known PCR assays are not practical to use in golf course or other intensively managed turf grass or professional landscape settings, as PCR requires specialised laboratory skills and instruments. Certain other molecular biology methods for decting fungal disease in turf grass are known and described, for example, in WO2009147017 which relates to a TRFLP methodology.

The present invention accordingly relates to a LAMP assay for detecting the presence of DNA in a turf sample which is associated with selected fungal pathogens that cause relevant turf diseases including, for example, anthracnose, take-all patch, summer patch, snow mold, *pythium* blight, brown patch and dollar spot.

To facilitate timely and efficient detection of turf grass disease pathogens and to improve the cost and effectiveness of turf grass disease treatments, a LAMP assay according to the invention can be utilized to earlier detect DNA associated with fungal pathogens which cause relevant turf diseases. In accordance with the invention, the LAMP method suitably uses a primer set of at least four and preferably six or more nucleic acid sequences derived from the target disease pathogens. More particularly, the inventive method provides that each primer used in the selected primer set for the LAMP assay has from 15 to 50 nucleic acids and where the primers in the set are selected from a specific DNA loci within the target fungi.

In accordance with the present invention, a method for detecting fungal DNA in a turf grass sample with a loop-mediated isothermal amplification (LAMP) assay is provided which contains primers for fungal DNA (nucleic acids) of a turf pathogenic fungi selected from the group consisting of *Sclerotinia homoeocarpa, Rhizoctonia solani* spp., *Pythium aphanidermatum, Gaeumannomyces graminis* spp., *Microdochium nivale* spp., *Magnaporthe poae, Colletotrichum graminicola, Colletotrichum cereale* and *Pythium ultimum* var. *ultimum*(target fungi). The LAMP assay of the present invention uses a primer set of at least four and preferably six or more nucleic acid sequences with each primer in the set having from 15 to 50 nucleic acids, and where the fungal DNA to be detected is obtained from a target fungal pathogen. The primers useful in the present LAMP assay method are selected from specific internal transcribed spacer regions or genes of the target fungi to provide improved assay results.

In a particular embodiment, the *Microdochium nivale* spp. target fungi are selected from *Microdochium nivale* var. *nivale* and *Microdochium nivale* var. *majus*. In another embodiment, the *Gaeumannomyces graminis* spp. target fungi are selected from *Gaeumannomyces graminis* var. *avenae, Gaeumannomyces graminis* var. *graminis* and *Gaeumannomyces graminis* var. *tritici*. In a further embodiment, the *Rhizoctonia solani* spp. target fungi are selected from *Rhizoctonia solani* AG2-21V and *Rhizoctonia solani* AG2-2111B.

In the context of the present invention, detection of fungal DNA with the inventive LAMP assay in a turf sample may be indicative of the presence of fungal pathogens and can also assist in assesing the onset or presence of a turf disease condition as follows:

| Fungal Pathogen | Turf Disease |
| --- | --- |
| *Sclerotinia homoeocarpa* | Dollar Spot |
| *Rhizoctonia solani* spp. | Brown Patch |
| *Microdochium nivale* spp. | Snow Mold |
| *Pythium aphanidermatum* | Pythium Blight |
| *Gaeumannomyces graminis* spp. | Take-all patch |
| *Magnaporthe poae* | Summer patch |
| *Colletotrichum graminicola* | Anthracnose |
| *Colletotrichum cereale* | Anthracnose |
| *Pythium ultimum* | Pythium Blight |

In one embodiment,
(a) the primer set for *Sclerotinia homoeocarpa* DNA is selected from within the DNA of SEQ ID NO: 1;
(b) the primer set for *Rhizoctonia solani* DNA is selected from within the DNA of SEQ ID NO: 2 or SEQ ID NO: 9;
(c) the primer set for *Microdochium nivale* spp. DNA (preferably *Microdochium nivale* var. *nivale*) is selected from within the DNA of SEQ ID NO: 3;
(d) the primer set for *Pythium aphanidermatum* DNA is selected from within the DNA of SEQ ID NO: 4 or SEQ ID NO: 10;
(e) the primer set for *Gaeumannomyces graminis* spp. DNA (preferably *Gaeumannomyces graminis* var. *avenae*, *Gaeumannomyces graminis* var. *graminis* or *Gaeumannomyces graminis* var. *tritici*) is selected from within the DNA of SEQ ID NO: 5 or SEQ ID NO: 8;
(f) the primer set for *Microdochium nivale* spp. DNA (preferably *Microdochium nivale* var. *majus*) is selected from within the DNA of SEQ ID NO:6;
(g) the primer set for *Magnaporthe poae* DNA is selected from within the DNA of SEQ ID NO: 7;
(h) the primer set for *Colletotrichum graminicola* DNA is selected from within the DNA of SEQ ID NO: 11,
(i) the primer set for *Colletotrichum cereale* DNA is selected from within the DNA of SEQ ID NO: 12; and
(j) the primer set for *Pythium ultimum* var. *Ultimum* DNA is selected from within the DNA of SEQ ID NO: 13

Preferably the LAMP primer sets sutiable for use in detecting fungi DNA in turf samples according to the present invention comprise four primers including: a pair of forward (FIP) and reverse (BIP) inner primers, and a pair of forward (F3) and reverse (B3) outer primers. More preferably, the LAMP primer sets sutiable for use in the present invention include the addition of loop forward (LF) and/or loop back (LB) primers to accelerate amplification of nucleic acid present in the turf sample and to reduce the detection time of any target fungi that may be present in such turf sample. The LAMP primer set embodiments listed below relate to the detection of the target fungi DNA in turf samples in accordance with the method of the invention.

In the description of the embodiments which follow that are associated with the primers of SEQ ID Nos. 14-91 according to the invention, it will be understood that the primers useful in the present invention each independently and respectively have a sequence which is at least 90%, preferably at least 95%, more preferably at least 96%, and even more preferably at least 97% identical to the primers of SEQ IDs of 14-91.

In a particularly prefered embodiment, the primers useful in the present invention each independently and respectively have a sequence which is at least at least 98%, more preferably at least 99% identical to the primers of SEQ IDs of 14-91. Most preferably, the primers useful in the present invention each independently and respectively have a sequence which is identical to SEQ IDs of 14-91.

Accordingly, the present invention provides a method for detecting fungal DNA in a turf grass sample with a loop-mediated isothermal amplification (LAMP) assay which contains primers for fungal DNA of at least one turf pathogenic fungi selected from *Sclerotinia homoeocarpa*, *Rhizoctonia solani* spp., *Pythium aphanidermatum*, *Gaeumannomyces graminis* spp., *Microdochium nivale* spp., *Magnaporthe poae*, *Colletotrichum graminicola*, *Colletotrichum cereale* and *Pythium ultimum* var. *ultimum*, comprising: subjecting the turf sample to a LAMP reaction wherein the LAMP reaction uses a primer set of four or more nucleic acid sequences with each primer in the set having from 15 to 50 nucleic acids, and wherein the set of primers comprises at least one primer set as described below.

In one embodiment, the primer set for detecting *Sclerotinia homoeocarpa* DNA comprises or is selected from SEQ ID NOs: 15 and 27.

In another embodiment, the primer set for detecting *Sclerotinia homoeocarpa* DNA comprises or is selected from SEQ ID NOs:14, 15, 16 and 17.

In a further embodiment, the primer set for detecting *Sclerotinia homoeocarpa* DNA comprises or is selected from SEQ ID NOs: 14, 15, 16, 17, 18 and 19.

In a further embodiment, the primer set for detecting *Rhizoctonia solani* DNA comprises or is selected from SEQ ID NO: 23.

In another embodiment, the primer set for detecting *Rhizoctonia solani* DNA comprises or is selected from SEQ ID Nos: 63, 64 and 65.

In another embodiment, the primer set for detecting *Rhizoctonia solani* DNA comprises or is selected from SEQ ID NO: 20, 21, 22 and 23.

In another embodiment, the primer set for detecting *Rhizoctonia solani* DNA comprises or is selected from SEQ ID NO: 62, 63, 66 and 67.

In yet another embodiment, the primer set for detecting *Rhizoctonia solani* DNA comprises or is selected from SEQ ID Nos: 62, 63, 64, 65, 66 and 67.

In another embodiment, the primer set for detecting *Rhizoctonia solani* DNA comprises or is selected from SEQ ID Nos: 20, 21, 22, 23, 24 and 25.

In another embodiment, the primer set for detecting *Microdochium nivale* spp. (preferably *Microdochium nivale* var. *nivale*) DNA comprises or is selected from SEQ ID Nos: 27, 28 and 29.

In another embodiment, the primer set for detecting *Microdochium nivale* spp. (preferably *Microdochium nivale* var. *nivale*) DNA comprises or is selected from SEQ ID NO: 26, 27, 28, and 29.

In a further embodiment, the primer set for detecting *Microdochium nivale* spp. (preferably *Microdochium nivale* var. *nivale*) DNA comprises or is selected from SEQ ID Nos: 26, 27, 28, 29, 30 and 31.

In one embodiment, the primer set for detecting *Pythium aphanidermatum* DNA comprises or is selected from SEQ ID NOs:33, 36 and 37.

In another embodiment, the primer set for detecting *Pythium aphanidermatum* DNA comprises or is selected from SEQ ID NO: 32, 33, 36, and 37.

In another embodiment, the primer set for detecting *Pythium aphanidermatum* DNA comprises or is selected from SEQ ID NOs: 32, 33, 34, 35, 36 and 37.

In another embodiment, the primer set for detecting *Pythium aphanidermatum* DNA comprises or is selected from SEQ ID NOs:69, 70 and 71.

In another embodiment, the primer set for detecting *Pythium aphanidermatum* DNA comprises or is selected from SEQ ID NO: 68, 69, 72 and 73.

In another embodiment, the primer set for detecting *Pythium aphanidermatum* DNA comprises or is selected from SEQ ID NOs: 68, 69, 70, 71, 72 and 73.

In one embodiment, the primer set for detecting *Gaeumannomyces graminis* spp. (preferably *Gaeumannomyces graminis* var. *avenae*, *Gaeumannomyces graminis* var. *graminis* or *Gaeumannomyces graminis* var. *tritici*) DNA comprises or is selected from SEQ ID NO: 60.

In another embodiment, the primer set for detecting *Gaeumannomyces graminis* spp. (preferably *Gaeumannomyces graminis* var. *avenae*, *Gaeumannomyces graminis* var. *graminis* or *Gaeumannomyces graminis* var. *tritici*) DNA comprises or is selected from SEQ ID NOs: 42 and 43.

In a further embodiment, the primer set for detecting *Gaeumannomyces graminis* spp. (preferably *Gaeumannomyces graminis* var. *avenae*, *Gaeumannomyces graminis* var. *graminis* or *Gaeumannomyces graminis* var. *tritici*) DNA comprises or is selected from SEQ ID NO: 38, 39, 42 and 43.

In a further embodiment, the primer set for detecting *Gaeumannomyces graminis* spp. (preferably *Gaeumannomyces graminis* var. *avenae*, *Gaeumannomyces graminis* var. *graminis* or *Gaeumannomyces graminis* var. *tritici*) DNA comprises or is selected from SEQ ID NO: 56, 57, 60 and 61.

In another embodiment, the primer set for detecting *Gaeumannomyces graminis* spp. (preferably *Gaeumannomyces graminis* var. *avenae*, *Gaeumannomyces graminis* var. *graminis* or *Gaeumannomyces graminis* var. *tritici*) DNA comprises or is selected from SEQ ID NOs: 38, 39, 40, 41, 42 and 43.

In another embodiment, the primer set for detecting *Gaeumannomyces graminis* spp. (preferably *Gaeumannomyces graminis* var. *avenae*, *Gaeumannomyces graminis* var. *graminis* or *Gaeumannomyces graminis* var. *tritici*) DNA comprises or is selected from SEQ ID NO: 56, 57, 58, 59, 60 and 61.

In one embodiment, the primer set for detecting *Microdochium nivale* spp. (preferably *Microdochium nivale* var. *majus*) DNA comprises or is selected from SEQ ID Nos: 48 and 49.

In a further embodiment, the primer set for detecting *Microdochium nivale* spp. (preferably *Microdochium nivale* var. *majus*) DNA comprises or is selected from SEQ ID NO: 44, 45, 48 and 49.

In yet another embodiment, the primer set for detecting *Microdochium nivale* spp. (preferably *Microdochium nivale* var. *majus*) DNA comprises or is selected from SEQ ID Nos: 44, 45, 46, 47, 48 and 49.

In another embodiment, the primer set for detecting *Magnaporthe poae* DNA comprises or is selected from SEQ ID NOs: 54 and 55.

In a further embodiment, the primer set for detecting *Magnaporthe poae* DNA comprises or is selected from SEQ ID NO: 50, 51, 54 and 55.

In another embodiment, the primer set for detecting *Magnaporthe poae* DNA comprises or is selected from SEQ ID NOs: 50, 51, 52, 53, 54, and 55.

In one embodiment, the primer set for detecting *Colletotrichum graminicola* DNA comprises or is selected from SEQ ID NOs:74, 76 and 77.

In a further embodiment, the primer set for detecting *Colletotrichum graminicola* DNA comprises or is selected from SEQ ID NO: 74 75, 78 and 79.

In another embodiment, the primer set for detecting *Colletotrichum graminicola* DNA comprises or is selected from SEQ ID NOs:74, 75, 76, 77, 78 and 79.

In another embodiment, the primer set for detecting *Colletotrichum cereale* DNA comprises or is selected from SEQ ID Nos 80, 82 and 83.

In a further embodiment, the primer set for detecting *Colletotrichum cereale* DNA comprises or is selected from SEQ ID NO: 80, 81, 84 and 85.

In another embodiment, the primer set for detecting *Colletotrichum cereale* DNA comprises or is selected from SEQ ID Nos 80, 81, 82, 83, 84 and 85.

In one embodiment, the primer set for detecting *Pythium ultimum* var. *Ultimum* Idin-rc DNA comprises or is selected from SEQ ID Nos: 86, 88 and 89.

In a further embodiment, the primer set for detecting *Pythium ultimum* var. *Ultimum* Idin-rc DNA comprises or is selected from SEQ ID NO: 86, 87, 90 and 91.

In another embodiment, the primer set for detecting *Pythium ultimum* var. *Ultimum* Idin-rc DNA comprises or is selected from SEQ ID Nos: 86, 87, 88, 89, 90 and 91.

The LAMP assays of the invention can be used for detection, including early detection, of DNA from turf fungi selected from the group consisting of *Sclerotinia homoeocarpa, Rhizoctonia solani, Pythium aphanidermatum, Gaeumannomyces graminis* spp., *Microdochium nivale* spp., *Magnaporthe poae, Colletotrichum graminicola, Colletotrichum cereale* and *Pythium ultimum* var. *Ultimum* in turf samples which is easy to obtain and allows management and/or maintenance of the turf grass to be tailored accordingly.

According to the invention, by "turf grass" there is understood an annual or perennial *Gramineae*. Said *gramineae* preferably belongs to one or more of the genera *Agropyron, Agrostis, Axonopus, Bromus, Buchloe, Cynodon, Eremochloa, Festuca, Lolium, Paspulum, Pennisetum, Phleum, Poa, Stenotaphrum* or *Zoysia*. More preferably, said *gramineae* belongs to one or more of the genera *Agrostis, Buchloe, Cynodon, Eremochloa, Festuca, Lolium, Paspulum, Pennisetum, Poa, Stenotaphrum* or *Zoysia*.

In one embodiment, according to the invention by "turf" is understood as a group of turf grass, which covers a surface area of ground and is subject to regular maintenance.

The present invention can be practiced with all turf grasses, including cool season turf grass and warm season turf grass.

Examples of cool season turf grasses are: Bluegrasses (*Poa* L.), such as Kentucky Bluegrass (*Poa pratensis* L.), Rough Bluegrass (*Poa trivialis* L.), Canada Bluegrass (*Poa compressa* L.) and Annual Bluegrass (*Poa annua* L.); Bentgrasses (*Agrostis* L.), such as Creeping Bentgrass (*Agrostis palustris* Huds.), Colonial Bentgrass (*Agrostis tenius* Sibth.), Velvet Bentgrass (*Agrostis canina* L.) and Redtop (*Agrostis alba* L.); Fescues (*Festuca* L.), such as Creeping Red Fescue (*Festuca rubra* L.), Chewings Fescue (*Festuca rubra* var. commutata Gaud.), Sheep Fescue (*Festuca ovine* L.), Hard Fescue (*Festuca longifolia*), Tall Fescue (*Festuca arundinacea* Schreb.), Meadow Fescue (*Festuca elatior* L.); Ryegrasses (*Lolium* L.), such as Perennial Ryegrass (*Lolium perenne* L.), Annual (Italian) Ryegrass (*Lolium multiflorum* Lam.); Wheatgrasses (*Agropyron* Gaertn.), such as Fairway Wheatgrass (*Agropyron cristatum* (L.) Gaertn.), Western Wheatgrass (*Agropyron smithii* Rydb.). Other cool season turf grasses include Smooth Brome (*Bromus inermis* Leyss.) and Timothy *Phleum* L.).

Examples of warm season turf grasses are Bermudagrasses (*Cynodon* L. C. Rich), Zoysiagrasses *Zoysia* Willd.), St. Augustinegrass (*Stenotaphrum secundatum* (Walt.) Kuntze), Centipedegrass *Eremochloa ophiuroides* (Munro.) Hack.), Carpetgrass (*Axonopus* Beauv.), Bahiagrass (*Paspalum notatum* Flugge.), Kikuyugrass (*Pennisetum clandestinum* Hochst. ex Chiov.), Buffalograss (*Buchloe dactyloides* (Nutt.) Engelm.) and Seashore *paspalum* (*Paspalum vaginatum* swartz).

The LAMP method invention also contemplates a kit for the detection of fungi in a turf grass sample using a LAMP assay. A test strip containing one or more than one of the primer sets as described herein can be utilized. In one embodiment, multiple primer sets are multiplexed on a test strip for the detection of multiple diseases from turf grass samples collected from a particular locus.

For example, a bijou tube with a ball bearing and a suitable amount of lysis buffer is provided with a 1 cubic cm homogenized turf sample and shaken vigorously for 1 minute. A test strip with sample well containing all the resuspension buffer and drops of this test solution are placed into a sample wells on a test strip wherein the wells have all the ingredients necessary to perform a LAMP reaction (e.g., the primer sets and a reagent such as an isothermal master mix cat no. iso-001 available from Optigene). In one embodiment, the test strips are multiplexed. In another embodiment, the test strip includes 8 wells, two control and 6 for turf diseases of interest. In one embodiment, the test strip is associated with a diagnostic instrument such as a Genie®II or III available from OptiGene.

Primer Design

Highly conserved genes were used for the design of the LAMP primers for the detection of DNA from selected turf grass pathogens (column 1 of TABLE 3). Pure genomic DNA from all fungi of interest was obtained using the NucleoSpin Plant II (MACHEREY-NAGEL). With PCR technology the sequence of interest were amplified using published primer pairs followed by a Sanger sequencing. The following DNA Loci (genes and regions) were sequenced: Internal transcribed spacer (ITS), elongation factor 1-alpha (EF), beta-tubulin (Tub), cytochrome c oxidase subunit 1 (Cox), superoxide dismutase (SOD1) and large subunit nuclear ribosomal RNA (LSU). The raw sequences were aligned using ClustalW alignment method (CLC Main Workbench Software). The BLAST comparisons with sequences from GenBank (NCBI) were used to identify gene homologs. Ideally, a good sequence is defined by successful PCR amplification for all target taxa and no homology with other taxa.

The best sequences (SEQ ID Nos, 1-13) from the sequenced DNA Loci were then used for the design of the LAMP primers for each of the selected turf grass pathogens using LAMP Designer 1.14 (PREMIER Biosoft). Therefore different parameters were tested to get different primer sets per organisms and loci (See TABLE 3 for a correlation of turf pathogen, selected loci and SEQ ID of best sequences used for primer design). The designed primers sets shown in TABLE 1 were then tested for their specificity (TABLE 3) and sensitivity (TABLE 4).

TABLE 1

| DNA SEQ ID (Primer Sets) | Primer SEQ ID NO. | Primer name |
|---|---|---|
| 1 | 14 | B3 |
|  | 15 | BIP |
|  | 16 | F3 |
|  | 17 | FIP |
|  | 18 | LB |
|  | 19 | LF |
| 2 | 20 | B3 |
|  | 21 | BIP |
|  | 22 | F3 |
|  | 23 | FIP |
|  | 24 | LB |
|  | 25 | LF |
| 3 | 26 | B3 |
|  | 27 | BIP |
|  | 28 | F3 |
|  | 29 | FIP |
|  | 30 | LB |
|  | 31 | LF |
| 4 | 32 | F3 |
|  | 33 | B3 |
|  | 34 | LF |
|  | 35 | LB |
|  | 36 | FIP |
|  | 37 | BIP |
| 5 | 38 | F3 |
|  | 39 | B3 |
|  | 40 | LF |
|  | 41 | LB |
|  | 42 | FIP |
|  | 43 | BIP |
| 6 | 44 | F3 |
|  | 45 | B3 |
|  | 46 | LF |
|  | 47 | LB |
|  | 48 | FIP |
|  | 49 | BIP |
| 7 | 50 | F3 |
|  | 51 | B3 |
|  | 52 | LF |
|  | 53 | LB |
|  | 54 | FIP |
|  | 55 | BIP |
| 8 | 56 | F3 |
|  | 57 | B3 |
|  | 58 | LF |
|  | 59 | LB |
|  | 60 | FIP |
|  | 61 | BIP |
| 9 | 62 | F3 |
|  | 63 | B3 |
|  | 64 | LF |
|  | 65 | LB |
|  | 66 | FIP |
|  | 67 | BIP |
| 10 | 68 | F3 |
|  | 69 | B3 |
|  | 70 | LF |
|  | 71 | LB |
|  | 72 | FIP |
|  | 73 | BIP |
| 11 | 74 | F3 |
|  | 75 | B3 |
|  | 76 | LF |
|  | 77 | LB |
|  | 78 | FIP |
|  | 79 | BIP |
| 12 | 80 | F3 |
|  | 81 | B3 |
|  | 82 | LF |
|  | 83 | LB |
|  | 84 | FIP |
|  | 85 | BIP |

TABLE 1-continued

| DNA SEQ ID (Primer Sets) | Primer SEQ ID NO. | Primer name |
|---|---|---|
| 13 | 86 | F3 |
|  | 87 | B3 |
|  | 88 | LF |
|  | 89 | LB |
|  | 90 | FIP |
|  | 91 | BIP |

Specificity

To examine the specificity of the reaction (Literature see below), assays using the designed primer sets are tested using pure genomic DNA extracts from the fungal isolates described in TABLE 2. A comprehensive collection of different turf grass pathogens from distinct geographical origins were collected and grow on different media (potato dextrose/malt/cornmeal/cherry/V8). A ten-day old fungal culture was used to extract the DNA from mycelium (NucleoSpin Plant II—MACHEREY-NAGEL). The genomic DNA was diluted with nuclease free water to 5 ng/µl and a portion of 2.5 µl was used for the specificity tests.

The LAMP specificity tests were performed on a Light-Cycler 480 (Roche) in 96 well plates at 64° C. for 55 min. The amplicon-specific annealing temperature was determined during cooling from 98° C. to 65° C. with a ramp rate of −0.1° C. per second. Real-time LAMP assays were carried out in 10 µl reaction mixtures containing 5 µl of isothermal master mix at a 1× concentration (Optigene), 0.4 µM each external primer, 1.6 µM each internal primer, and 0.8 µM each loop primer (synthesized by Microsynth) and 2.5 µl of genomic DNA.

All reactions were carried out in duplicate and at two different days.

Literature for Performing Specificity

Besuschio, S. A., Murcia, M. L., Benatar, A. F., Monnerat, S., Cruz, I., Picado, A., Schijman, A. G. (2017). Analytical sensitivity and specificity of a loop-mediated isothermal amplification (LAMP) kit prototype for detection of *Trypanosoma cruzi* DNA in human blood samples. PLOS Neglected Tropical Diseases, 11 (7), e0005779.

Kitamura, M., Aragane, M., Nakamura, K., Watanabe, K., & Sasaki, Y. (2016). Development of Loop-Mediated Isothermal Amplification (LAMP) Assay for Rapid Detection of *Cannabis sativa*. Biological and Pharmaceutical Bulletin, 39 (7), 1144-1149.

Seki, M., Kilgore, P. E., Kim, E. J., Ohnishi, M., Hayakawa, S., & Kim, D. W. (2018). LoopMediated Isothermal Amplification Methods for Diagnosis of Bacterial Meningitis. Frontiers in Pediatrics, 6.

Wang, D.-G., Brewster, J. D., Paul, M., & Tomasula, P. M. (2015). Two Methods for Increased Specificity and Sensitivity in Loop-Mediated Isothermal Amplification. Molecules, 20 (4), 6048-6059.

TABLE 2

| ID | Microorganism | Strain number |
|---|---|---|
| 1 | *Colletotrichum cereale* | Stein 13-421 |
| 2 | *Colletotrichum cereale* | Stein UKCC1 |
| 3 | *Colletotrichum cereale* | Stein 13-394 |
| 4 | *Colletotrichum cereale* | Stein 13-396 |
| 5 | *Colletotrichum cereale* | Stein 13-415 |
| 6 | *Colletotrichum cereale* | Stein 871 |

TABLE 2-continued

| ID | Microorganism | Strain number |
|---|---|---|
| 7 | *Colletotrichum graminicola* | CBS 113173 |
| 8 | *Colletotrichum graminicola* | CBS 130836 |
| 9 | *Gaeumannomyces graminis* | Stein 870 |
| 10 | *Gaeumannomyces graminis* var. *avenae* | CBS 187.65 |
| 11 | *Gaeumannomyces graminis* var. *avenae* | Stein 880 |
| 12 | *Gaeumannomyces graminis* var. *avenae* | CBS 870.73 |
| 13 | *Gaeumannomyces graminis* var. *graminis* | CBS 387.81 |
| 14 | *Gaeumannomyces graminis* var. *graminis* | CBS 235.32 |
| 15 | *Gaeumannomyces graminis* var. *graminis* | CBS 903.73 |
| 16 | *Gaeumannomyces graminis* var. *tritici* | Stein 334 |
| 17 | *Gaeumannomyces graminis* var. *tritici* | CBS 186.65 |
| 18 | *Gaeumannomyces graminis* var. *tritici* | CBS 247.29 |
| 19 | *Magnaporthe poae* | CBS 131396 |
| 20 | *Magnaporthe poae* | CBS 131395 |
| 21 | *Microdochium nivale majus* | Stein 529 |
| 22 | *Microdochium nivale nivale* | Stein 72 |
| 23 | *Microdochium nivale* var. *nivale* | Stein 868 |
| 24 | *Microdochium nivale* var. *nivale* | Stein UKMN1 |
| 25 | *Microdochium nivale* var. *nivale* | Stein MN12055 |
| 26 | *Pythium aphanidermatum* | CBS 164.68 |
| 27 | *Pythium aphanidermatum* | Stein 889 |
| 28 | *Pythium aphanidermatum* | Stein K5902 |
| 29 | *Pythium aphanidermatum* | Stein 186 |
| 30 | *Pythium aphanidermatum* | Stein K6179 |
| 31 | *Pythium aphanidermatum* | Stein 620 |
| 32 | *Pythium ultimum* | CBS 122650 |
| 33 | *Pythium ultimum* var. *sporangiiferum* | CBS 219.65 |
| 34 | *Pythium ultimum* var. *ultimum* | CBS 305.35 |
| 35 | *Pythium ultimum* var. *ultimum* | Stein 71 |
| 36 | *Pythium ultimum* var. *ultimum* | Stein 146 |
| 37 | *Pythium ultimum* var. *ultimum* | CBS 378.34 |
| 38 | *Pythium ultimum* var. *ultimum* | CBS 725.94 |
| 39 | *Pythium ultimum* var. *ultimum* | CBS 726.94 |
| 40 | *Pythium ultimum* var. *ultimum* | Stein K6772 |
| 41 | *Pythium ultimum* var. *ultimum* | Stein K6773 |
| 42 | *Rhizoctonia solani* AG1.1C | CBS 109195 |
| 43 | *Rhizoctonia solani* AG2-2IV | CBS 109196 |
| 44 | *Rhizoctonia solani* AG4 | CBS 253.29 |
| 45 | *Rhizoctonia solani* AG | Stein 160 |
| 46 | *Rhizoctonia solani* AG2-2IIIB | Stein 722 |
| 47 | *Rhizoctonia solani* AG1-1A | Stein 184 |
| 48 | *Rhizoctonia solani* AG1-1 | ZHAW 103 |
| 49 | *Rhizoctonia solani* AG1-1A | CBS 101759 |
| 50 | *Rhizoctonia solani* AG1-1B | CBS 101761 |
| 51 | *Rhizoctonia solani* AG1-1C | CBS 101762 |
| 52 | *Rhizoctonia solani* AG1-1A | CBS 205.84 |
| 53 | *Rhizoctonia solani* AG1-1B | CBS 324.84 |
| 54 | *Rhizoctonia solani* AG2-2IIIB | CBS 101765 |
| 55 | *Rhizoctonia solani* AG4 | CBS 319.33 |
| 56 | *Sclerotinia homoeocarpa* | CBS 510.89 |
| 57 | *Sclerotinia homoeocarpa* | Stein 867 |
| 58 | *Sclerotinia homoeocarpa* | Stein 869 |
| 59 | *Sclerotinia homoeocarpa* | Stein UKSH1 |
| 60 | *Sclerotinia homoeocarpa* | Stein UKSH2 |
| 61 | *Sclerotinia homoeocarpa* | Stein UKSH3 |
| 62 | *Sclerotinia homoeocarpa* | Stein 13-392 |
| 63 | *Sclerotinia homoeocarpa* | Stein 13-410 |
| 64 | *Sclerotinia homoeocarpa* | Stein S-9 |
| 65 | *Sclerotinia homoeocarpa* | Stein S-83 |
| 66 | *Thanatephorus cucumeris/Rhizoctonia solani* AG3 | CBS 251.31 |
| 67 | *Thanatephorus cucumeris/Rhizoctonia solani* AG2-2IIIB | SYN 866 |
| 68 | *Thanatephorus cucumeris/Rhizoctonia solani* AG1-1A | Stein 184 |
| 69 | *Thanatephorus cucumeris/Rhizoctonia solani* AG4 | Stein 689 |

Stein and SYN strains: Syngenta, CH-4332 Stein, Switzerland
CBS strains: Westerdijk Fungal Biodiversity Institute, Utrecht, The Netherlands
ZHAW strains: Zurich University of Applied Sciences, Postfach 8820, Wadenswil, Switzerland Interpretation of the Results As summarized in TABLE 3, the specificity of the LAMP assay was checked against the designed specific target for the fungi strains listed in TABLE 2. As an additional confirmation of specificity, a matching melting temperature of 82.6-89.9° C.±0.5° C. was observed for the different amplified products as also shown in TABLE 3.

A 1 cm³ cube of the turf sample is placed into a Bijou tube containing 1 ml of lysis buffer (Optigene). The homogenization of the turf sample is conducted by shaking the Bijou

TABLE 3

| Turf Grass Pathogen | DNA Loci | DNA of SEQ ID NO. | Primer set (Table 1) | Tm +/− 0.5° C. (melting temperature) | Positive reaction with organisms (Table 2) |
|---|---|---|---|---|---|
| Sclerotinia homoeocarpa | Elongation factor 1-alpha | 1 | 1 | 87.1 | 56-65 |
| Rhizoctonia solani AG2-2IIIB | Internal Transcribed Spacer | 2 | 2 | 86.0 | 43, 46, 48, 54, 55, 67 |
| Rhizoctonia solani AG2-2IV | Beta-Tubulin | 9 | 9 | 89.9 | 43 |
| Microdochium nivale var. nivale | Beta-Tubulin | 3 | 3 | 88.9 | 22-25 |
| Pythium aphanidermatum | Beta-Tubulin | 4 | 4 | 89.3 | 26-31 |
| Pythium aphanidermatum | Cytochrome c oxidase subunit 1 | 10 | 10 | 82.6 | 26-31, 32-33 |
| Gaeumannomyces graminis var. Avenae | Beta-Tubulin | 5 | 5 | 89.7 | 10-18 |
| Gaeumannomyces graminis var. Avenae | Beta-Tubulin | 8 | 8 | 88.2 | 10-18 |
| Microdochium nivale var. majus | Beta-Tubulin | 6 | 6 | 89.2 | 21 |
| Magnaporthe poae | Beta-Tubulin | 7 | 7 | 88.4 | 19-20 |
| Colletotrichum graminicola | Superoxide Dismutase | 11 | 11 | 88.9 | 7-8 |
| Colletotrichum cereale | Superoxide Dismutase | 12 | 12 | 89.6 | 2-6 |
| Pythium ultimum var. ultimum | Large Subunit Nuclear Ribosomal RNA | 13 | 13 | 88.8 | 33-41 |

The sensitivity of the of the described primer sets corresponding to the DNA of Seq ID Nos. 1-13 (Table 1) were determined using serial dilutions of genomic DNA (1 ng to 100 fg) of all fungi of interests, with each reaction made in duplicate at two different days. Pure genomic DNA from all fungi was obtained using the NucleoSpin Plant II (MACHEREY-NAGEL). The LAMP sensitivity tests were performed on a LightCycler 480 (Roche) in 96 well plates at 64° C. for 55 min. The amplicon-specific annealing temperature was determined during cooling from 98° C. to 65° C. with a ramp rate of −0.1° C. per second. Real-time LAMP assays were carried out in 10 µl reaction mixtures containing 5 µl of isothermal master mix at a 1× concentration (Optigene), 0.4 µM each external primer, 1.6 µM each internal primer, and 0.8 µM each loop primer (synthesized by Microsynth) and 2.5 µl of genomic DNA.

TABLE 4

| DNA of SEQ ID NO. | Tm +/− 0.5° C. (melting temperature) | Sensitivity/detection limit of genomic DNA |
|---|---|---|
| 1 | 87.1 | 2.5 picogram |
| 2 | 86.0 | 2.5 picogram |
| 3 | 88.9 | 250 picogram |
| 4 | 89.3 | 25 picogram |
| 5 | 89.7 | 25 picogram |
| 6 | 89.2 | 25 picogram |
| 7 | 88.4 | 25 picogram |
| 8 | 88.2 | 2.5 picogram |
| 9 | 89.9 | 250 picogram |
| 10 | 82.6 | 25 picogram |
| 11 | 88.9 | 25 picogram |
| 12 | 89.6 | 25 picogram |
| 13 | 88.8 | 2.5 picogram |

Method of Detecting Fungal Pathogen in a Turf Grass Sample
Sample Collection

A tuft of turf sample including grass roots is collected at a location where a fungal pathogen is expected. The turfgrass may also show symptoms. The turf sample is placed in a clean 50 ml tube (Corning) and stored at −20° C. until use. DNA is extracted using Plant Material Lysis Kit (Optigene).

tube for 1 min. A volume of 10 µl of the lysate is transferred into a dilution tube provided (Optigene) and mixed vigorously by shaking. The diluted lysate is subsequently defined as the template.

LAMP Reaction

In some embodiments, the LAMP reaction is performed at about 60° C. to about 70° C., such as about 64° C. to about 67° C., or about 64° C. to about 66° C. In specific examples, the LAMP reaction is performed at 64° C.

In some embodiments, the LAMP reaction is allowed to proceed for about 15 to about 45 minutes, such as about 20 minutes to about 40 minutes, or about 25 minutes to about 35 minutes.

In some embodiments, the concentration of primers in the LAMP reaction according to the present invention is 1.4-1.8 µM, more specifically 1.6 µM for the forward (FIP) and reverse (BIP) inner primers, 0.2-0.4 µM, more specifically 0.4 µM for forward (F3) and reverse (B3) outer primers, and 0.4-0.8 µM, more specifically 0.8 µM, loop forward (LF) and/or loop back (LB) primers that are useful to accelerate amplification of nucleic acid present in the turf sample and to reduce the detection time of any target fungi DNA that may be present in such turf sample.

Suitable buffer systems useful in the reaction of LAMP assay include:

1× Isothermal Amplification Buffer Pack from New England Biolabs
  20 mM Tris-HCl
  10 mM $(NH_4)_2SO_4$.
  50 mM KCl
  2 mM $MgSO_4$
  0.1% Tween® 20
  (pH 8.8 @ 25° C.)
1× Isothermal Amplification Buffer II Pack from New England Biolabs
  20 mM Tris-HCl
  10 mM $(NH_4)SO_4$.
  150 mM KCl
  2 mM $MgSO_4$
  0.1% Tween® 20
  (pH 8.8 @ 25° C.)

Suitable enzyme systems (DNA polymerase, etc.) useful in the reaction of LAMP assay include:

| Distributor | catalog | Product name |
|---|---|---|
| New England Biolabs | M0374 | Bst 3.0 DNA Polymerase |
| New England Biolabs | M0537 | Bst 2.0 DNA Polymerase |
| New England Biolabs | M0538 | Bst 2.0 WarmStart ® DNA Polymerase |
| New England Biolabs | M0275 | Bst DNA Polymerase, Large Fragment |
| Lucigen | 30066 | LavaLAMP ™ DNA Master Mix |
| Lucigen | 30067 | LavaLAMP ™ DNA Master Mix with Dye |
| Eiken | LMP204 | DNA Amplification Kit |
| Eiken | LMP207 | Dried DNA Amplification Reagent |
| Optigene | ISO-001 | FAST isothermal amplification with dye |
| Optigene | ISO-001nd | FAST isothermal amplification |
| Optigene | ISO-DR001 | FAST isothermal amplification with dye, dried |
| Optigene | ISO-004 | FASTEST isothermal amplification with dye |
| Optigene | ISO-004nd | FASTEST isothermal amplification |
| Optigene | ISO-DR004 | FASTEST isothermal amplification with dye, dried |
| Optigene | ISO-001Tin | HIGHLY THERMOSTABLE enzyme suitable for isothermal amplification with dye |
| Optigene | ISO-DR001Tin | HIGHLY THERMOSTABLE enzyme suitable for isothermal amplification with dye, dried |

In one embodiment, the LAMP reactions are performed on a Genie instrument (Optigene) in a test strip with dried reagents (Optigene). In one embodiment, the strips have eight 150 µl wells (2 control and 6 for assays). Real-time LAMP assays are carried out in 25 µl reaction mixtures containing 15 µl of isothermal master mix at a 1× concentration (Optigene), 0.4 µM each external primer, 1.6 µM each internal primer, and 0.8 µM each loop primer (synthesized by Microsynth) selected from at least one of the primer sets of Table 1. Prior to adding the template, the lyophilized reaction strip is resuspended in 22 µl resuspension buffer (Optigene). All test strips include a negative control and a positive plant control primer set provided by Optigene. For all assays, 3 µl of template is added per reaction and well. The reaction is held at 64° C. for 30-55 min followed by an anneal program. The temperature profile of the anneal program is determined during cooling from 98° C. to 65° C. with a ramp rate of −0.1° C. per second.

The isothermal master mix contains a fluorescent double-stranded DNA binding dye to permit the real-time detection of the amplicons. The assays are optimized in terms of reaction time, temperature, and the volume of DNA added per reaction.

The fluorescence data that is acquired during amplification phase at 64° C. is reported as amplification time. The fluorescence derivative data that is acquired during the anneal phase is reported as an annealing temperature.

Alternatively, the LAMP assay reaction does not include an anneal program in which case a pH-sensitive indicator dye can be used to assess the presence of target fungal DNA. In some examples, the pH-sensitive indicator dye is a colored dye detectable in visible light. In particular examples, the colored dye comprises cresol red, phenol red, m-cresol purple, bromocresol purple, neutral red, naphtholphthalein, thymol blue or naptolphthalein. In other examples, the pH-sensitive indicator dye is a fluorescent indicator dye. In particular examples, the fluorescent dye comprises 2',7'-bis-(2-carboxyethyl)-5(6)-carboxyfluorescein, 5(6)-carboxy-2',7'-dichlorofluorescein, 5(6)-carboxyfluorescein, 3,6-diacetoxyphthalonitrile, 6,8-dihydroxy-1,3-pyrenedisulfonic acid, or 5-(and-6)-carboxyl seminaphthorhodafluor.

Following the foregoing procedures, the detection of the presence of fungal pathogen DNA (Table 3) in a turf sample may indicate the presence of a turf fungal pathogen that may cause relevant turf diseases (including, for example, anthracnose, take-all patch, summer patch, snow mold, *pythium* blight, brown patch and dollar spot). Early and efficient detection provides suitable turf grass disease management decisions to be undertaken.

SEQUENCE LISTING

```
<210> 1
<211> 912
<212> DNA
<213> Sclerotinia homoeocarpa
<400> 1
tagatctaca catggttctt acattatatt taggtcactt gatctacaag tgcggtggaa     60
ttgacaagcg tactattgaa aagttcgaga cggtatgact tctccacctt tctcttgcta    120
tcttttcccg tccttctcat cgagatcagt gtctgcgatc ttggtgctga tggatttatc    180
gggttgcgtt ttctctcatg cgcggagcat acatccgaat tctcaaccct ttgaacatta    240
ccacattgcc tttccagaat cctttgcta acccgttaat aggaagccaa ggagatggga    300
aagggttcct tcaagtacgc atgggttttg gacaagttga aggctgagcg tgagcgtggt    360
atcaccatcg acattgccct ctggaagttc gagacaccta agtacaatgt tactgtcatt    420
ggtatgtgta cgaattcttt atgccaactg aagtatatta acccattcgc agatgcccc    480
ggtcatcgtg atttcatcaa gaacatgact actggtacct cccaagctga ttgtgccatt    540
cttatcatcg ctgccggtgt tggtgagttc gaggctggta tctccaagga tggtcagacc    600
cgtgagcacg ctcttcttgc gtacacttctt ggtgttaagc aacttatcgt tgccatcaac    660
aagatggaca ccaccaagtg gtccaaggat cgtttcgagg aaatcatcaa ggagacaacc    720
aacttcatca agaaggttgg ctacaacgcc aagactgttc ccttcgtgcc gatctctgga    780
```

SEQUENCE LISTING

```
ttcgagggtg ataacatgat tgagccctca actaactgcc catggtacaa gggctgggag    840
agagagtcca aggagtctgg caaacacacc ggcaagaccc ttcttgaggc catcgacagc    900
atggacctgc ct                                                        912

<210> 2
<211> 629
<212> DNA
<213> Rhizoctonia solani AG2-2IIIB
<400> 2
tgtagctggc tccattagtt tggagcatgt gcacaccttt tgctcttttt ttaatccaca     60
cacacctgtg aacctgtgag gcagagacat ggatgggaga acttttattt actttaaaat    120
gaatgattgg gaccccctacc ccccccccc tctgtctact caactctaat ataaacccaa    180
tttattttaa aatgaatgta atggatgtaa cgcatctaat actaagtttc aacaacggat    240
ctcttggctc tcgcatcgat gaagaacgca gcgaaatgcg ataagtaatg tgaattgcag    300
aattcagtga atcatcgaat cttgaacgc acctgcgc ccttggtatt ccttggagca      360
tgcctgtttg agtatcatga aatcttcaaa gtaaaccttt ttgttaactc aatttggttt    420
cacttttgta ttggaggttc ttgcagcttc acacgctgct cctctttgtt cattagctgg    480
atctcagtgt tatgcttggt tcctctcggc gtgataaatt atctatcgct gaggactccc    540
gataaaaagg ttggccaagg taaatgcaga tgaaccgctt ctaatagtcc attgacttgg    600
acaataaaat aattattatt ttacgatct                                      629

<210> 3
<211> 613
<212> DNA
<213> Microdochium nivale var. nivale
<400> 3
ggtaaccaaa tcggtgctgc tttctggtgc gtacacctcg actcgaagac gaccacgacc     60
ttcgcgacga aatgaactc ggcagccaaa aacgtgccg tcgagaatct ttagtcgcag      120
aggaatctaa cataagggtg gagaccggca aggctaacac tatcttccct gatacaggca    180
gaccatctcc ggcgagcacg gtcttgacag cgatggagtg taagttcaat aaccgactcg    240
cagttccttg cgagagaccg cttccctgac ggcttctcgg gccagatgaa atgcaacagt    300
actgacattc tgccaatagc tacaacggca actctgagct ccagctcgag cgcatgagcg    360
tctacttcaa cgaggtatgt caccatgggc gacttcgggc ttcacacatt cggccagcta    420
ctaactgacc acccacataa cttaggcttc cggcaacaag tacgttcccc gcgccgtcct    480
cgtcgatctc gagcccggta ccatggatgc cgtccgtgct ggtcccttcg gccagctgtt    540
ccgtcccgac aacttcgtct tcggtcagtc cggtgctggc aacaattggg ccaagggtca    600
ctacactgag ggt                                                       613

<210> 4
<211> 455
<212> DNA
<213> Pythium aphanidermatum
<400> 4
cttcagtgaa ctccatctcg tccataccct caccagtgta ccagtgcaag aaggccttac     60
gacggaacat ggccgtgaac tgctcgctga cacgcttgaa catctcctgg atggcagtcg    120
agttaccgat gaacgtggcg ctcatcttga gaccctttgg tgggatgtca caaacgttga    180
ccttgatgtt gttcgggatc cactcaacga agtacgacga gttcttgttc tgaacgttga    240
gcatctgctc gtcgacctcc ttggtgctca tacgaccacg gaacatacaa gcggcggtca    300
ggtaacgacc gtgacgagga tcagcggcac acatcatgtt cttggcgtcg aactgctgct    360
gggtcagctc tggcaccgta agggcacggt actgctgcga gccgcgcgag gtgagcggag    420
cgaaaccgac catgaagaag tggaacgggg gaaaa                               455

<210> 5
<211> 518
<212> DNA
<213> Gaeumannomyces graminis var. avenae
<400> 5
ttagtgaccc ttggcccagt tgttgccagc accagactgg ccgaaaacga agttgtcggg     60
gcggaacagc tggccgaagg gaccggcacg aacggcgtcc atggtgccgg gctcgagatc    120
gacgaggacg gcacggggga catgcttgtt gccggaggcc tggagcggaa aggttatggg    180
tcagaataca tgatacgaag gtgggaaata ccggctgcta atgccggaca gaagcttcaa    240
ctcagggcct gtctgcatac ctcgttgaag tagacgctca tgcgctcgag ctggagctcc    300
gaggtgccgt tgtacctgta tcaatatgtc agagcggtga acggacgggg ggccgagcca    360
caagcaggac gaaatacgta cacgccattg ctgtcgagac cgtcgctcgct agaaatggtc    420
tgcctgtcaa agaagtcagt acgggtcacg ggcagtggca gtcgtggtcg gcggcggatc    480
gtcgcgcggc gtcgtttcat accagaaagc agcaccgt                            518

<210> 6
<211> 550
<212> DNA
<213> Microdochium nivale var. majus
<400> 6
```

SEQUENCE LISTING

```
ggtaaccaaa tcggtgctgc tttctggtgc gtacaactcc gatactcaac gacggccgca      60
gtgacctttg cgacgaaaac aaactcggcg gtcaaacccg tatcgccgaa aatcttcggt     120
cgcagaggaa tctggcaaaa gggtggaaat aaacaagcaa ggctaacact ctcttccccg     180
acacaggcaa accatctcca gtgagcacgg tctcgacagc aatggcgtgt aagttcaata     240
accgactcgc acttcttgcg aaaggccact tccctgatgg cgtatcacgc cagatgaaat     300
acacaagtac tgcatcctg tcaatagcta caacggcacc tccgagctcc agctcgagcg      360
catgagtgtc tacttcaatg aggcttccgg caacaagtac gttcctcgtg ccgtccttgt     420
cgatctcgag cccggtacca tggatgccgt ccgtgctggt cccttcggcc agctgttccg     480
ccccgacaac ttcgtcttcg gtcagtccgg tgctggcaac aactgggcca agggtcacta     540
cactgagggt                                                            550
```

<210> 7
<211> 485
<212> DNA
<213> *Magnaporthe poae*

<400> 7

```
ttagtgaccc ttggcccagt tgttgccagc accggactgg ccgaaaacga agttgtcggg      60
gcggaacagc tggccgaagg gaccagcacg gacagcatcc atggtgccgg gctcgagatc     120
gaccagacg gcacgggga catgcttgtt gccggaggcc tagagcgcgg ggaggcaatg       180
gtgtcagaaa aacaacacgt ggttgcgaaa gagagacgcg ttcggagtct atctgcatac    240
ctcgttgaag tagacgctca tgcgctcgag ctggagctcc gaggtaccgt tgtaactgca     300
ccaatatgtc agagcggtga acggacatgt ggccgaggat ctcccaaaca gaatacatac     360
actccattgc tgtcgagacc gtgctcgctg gagatgtttt gcctgcccag gaagtcagta    420
tcaatgatgg atgatcacgg tcgtggtggg tgcgagcggt ggttcgtacc agaaagcagc    480
accgt                                                                485
```

<210> 8
<211> 539
<212> DNA
<213> *Gaeumannomyces graminis* var. *avenae*

<400> 8

```
cctcagtgaa ctccatctcg tccatacct cgccagtgta ccaatgaagg aaagccttgc       60
gcctgaacat ggcagtgaac tgctcaccaa cacgcttgaa gagctcttgt atggcagtcg     120
agtttccgat gaaggtcgac gacatcttca ggccccgggg agggattgag cagagggcgg    180
tctggatgtt gttgggaatc cactcgacga agtacgacga gttcttgttc tggatgttgc    240
gcatctggtc ctcgacctcc ttcatggaga ccttaccacg gctatcgcac acagggatgg    300
ttagttagtg ccttctaggt tgggcatatt aaatgggcca gataaataag cccaatgcct     360
agatgcaaga ctcacaaaat agcagagcag gtcaggtagc gaccgttgcg gaagtccgag    420
gcagccatca tgttcttggg gtcgaacatc tgctgggtca actcgggcac cgtgacggcg    480
cggaatgagt gggcgccgcg gctagtcagg ggagcgaagc cgaccatgaa gaagtggag    539
```

<210> 9
<211> 236
<212> DNA
<213> *Rhizoctonia solani* AG2-2IV

<400> 9

```
gttgtagggc tcaacaaccg tgtcggagac cttgggggaa ggaacgaccg agaatgtgca       60
catcatacga tcgggtatt cttcacggat cttggagatc aaaagggtgc ccataccggc      120
accggttcct ccaccgagcg agtgggtaat ctggaagccc tgaagacact cgcatccctc     180
ggcctctttg cgcgcgacat cgagaactgc gtcaacaagc tcggcacctt cggtgt         236
```

<210> 10
<211> 604
<212> DNA
<213> *Pythium aphanidermatum*

<400> 10

```
tgcttttca ggtgtagttg gtacaacttt atctgtttta attagaatgg aattagcaca       60
acctggtaat caaattttta tgggaaatca tcaattatat aatgttgttg taacagcaca    120
tgctttata atgattttct tcatggttat gcctgtatta attggtggtt ttggtaactg     180
gtttattcct ttaatgattg gtgctccaga tatggctttt cctagaatga ataatattag    240
ttttggtta ttacctcctt cattattatt attagtatca tctgctatag tagaatcagg     300
tgctggtaca ggttggactg tatatccacc attatcaagt gtacaagcac actcaggacc    360
ttcagtagat ttagctattt ttagtttaca tttatctggt atttcttcat tattaggtgc    420
tattaatttt ttatcaacta tttataatat gagagctcct ggattaagtt ttcatagatt    480
gccattattt gtttggtctg ttttttattac agctttttta ttattgttaa cattaccagt    540
attagcaggt gctattacaa tgttattaac agatagaaat ttaaatactt ctttttatga     600
tcct                                                                   604
```

<210> 11
<211> 657
<212> DNA
<213> *Colletotrichum graminicola*

<400> 11

SEQUENCE LISTING

```
aatattctcg acatatgcag cctttccgtt gagatactat gtacgatcac tgttagcatc    60
tcttttcaaa aaaggtcttg ttggtgtcca cgaacctgaa ggtagtacgc gtgctcccac   120
atgtcaatac caaagatggg cacgcccttg gtgacagggt cctggtcttt cgtcgtgata   180
atgctgaggc ccgttatgtc atccttaaca agccacccc agccgctacc ggtgataccc    240
agcagcgtgt tgttgaaagc ctgcttgaac tggtcgagcc cgcccagac gcgggtgatc    300
tcggcgacga gctttggcgc cgcatcgggc gaggcatcac cgctcgaggc tggggaaagg   360
ttctcccaga ataggaatg gttgatgtgg ccgccgccgt tgaagtttag ggccgcgagg    420
acggcgatgc gattctggag cgggtttgca ttgtaagtct cgatggcctt gttcagattt   480
gtaacgtatg cttgatggct gtaggtggct tcatgtcaac tctcttcttc gctgcttcat   540
atttcatggt tatctcactg tttgctgtgg tgcagctcca tgatctgagc tgagatgtga   600
ggctcgaggg cctgcaggag gggtcagcgg gcgcgatcgc gagcacgagt aagggat     657
```

<210> 12
<211> 663
<212> DNA
<213> *Colletotrichum cereale*
<400> 12

```
cgttccagat gttctcgacg tacgccgctt ttccattgag gtactgaggc cgagcattgt    60
tagtaccttc caacaaagca gatccgtcag tgtttacgaa cctggaggta gtacgcgtgc   120
tcccacatgt ccacgccgaa gatgggcacg cccttggtga cagggtcctg gtctttcgtc   180
gtgatgatgc tcagacccgt tacgtcgtcc ttgaccagcc atcccagcc gctgccggtg    240
atcccagaa gcgtggcgtt gaaagcctgc ttgaactggt cgagcccgcc ccagaccggt   300
gcgatctcag cgacgagctt cggcgcggcg tctggcgagg cgtctgggct cgaggcaggg   360
gacaggtttt cccagaagag ggagtggttg atgtggccgc cgccgttgaa gttgagggct   420
gggaggacgg cgatgcggtt ctggagggg ttcgcgttgt aggtctcgac ggccttgttt    480
agatttgtaa cgtatgcttc gtgactgcga tggtttgatt tcaaccctgt tcttctttg    540
tttctagtgc ctagctctct tactgtttgc tgtggtcag ctccatgatc tgggctgaga    600
tgtgcggctc gagagcctgg aagaggggtc agcgggtgcg accgcgaaca caagtacggg   660
gat                                                                 663
```

<210> 13
<211> 703
<212> DNA
<213> *Pythium ultimum* var. *ultimum*
<400> 13

```
tcagaagaaa ggtttcctac ctcagacagc gtacgccatc ctttactttc atttcgcgct    60
ggggtttcca caccctaaca cttgcacaca tgttagactc cttggtccgt gtttcaagac   120
gggccgaatc gctccatttc gtcaaagtcc cgaacggcaa aagttactct agatctcaat   180
cgaccaatca ctccgtcagc atagcaagct atccaaacag gtaaccaaac gagagtccca   240
aacactttaa agcacattgt aggcacctca gtcccaacca cgacaactaa ctaccaagat   300
ataacagcca agagcaagct cctaacctac ctcctcagta gccattctc acagcatacg    360
aactgactct gacgtcccac cgcaacacag ggcaccaaca agcaaacgca gaacagcaca   420
aagagcagaa aaccacttct tacatactgc acgcacctac tcgccaatga aatatgctac   480
agattataga cactggatac gattcgcttc cctttcagca gtttcaggta ctcctttaact   540
ctcttttcaa agttctttc atctttccct cacggtactt gttcgctatc ggtctcgcac    600
caatatttag ctttagatgg aatttaccac ctactttgcg ctgcagtccc aaacaacgcg   660
actcaaagaa aacgtgtcgt acgcacaagc tactcaggca caa                    703
```

<210> 14
<211> 18
<212> DNA
<213> Artificial Sequence
<220>
<223> Primer for fungal detection
<400> 14

```
gctcagcctt caacttgt                                                  18
```

<210> 15
<211> 45
<212> DNA
<213> Artificial Sequence
<220>
<223> Primer for fungal detection
<400> 15

```
gcctttccag aatccctttg cttttgaag gaacccttc ccatc                      45
```

<210> 16
<211> 19
<212> DNA
<213> Artificial Sequence
<220>
<223> Primer for fungal detection

SEQUENCE LISTING

```
<400> 16
ggtggaattg acaagcgta                                          19

<210> 17
<211> 43
<212> DNA
<213> Artificial Sequence
<220>
<223> Primer for fungal detection
<400> 17
atgctccgcg catgagagtt ttcttctcat cgagatcagt gtc              43

<210> 18
<211> 21
<212> DNA
<213> Artificial Sequence
<220>
<223> Primer for fungal detection
<400> 18
ccgttaatag gaagccaagg a                                       21

<210> 19
<211> 19
<212> DNA
<213> Artificial Sequence
<220>
<223> Primer for fungal detection
<400> 19
tccatcagca ccaagatcg                                          19

<210> 20
<211> 20
<212> DNA
<213> Artificial Sequence
<220>
<223> Primer for fungal detection
<400> 20
atttaccttg gccaaccttt                                         20

<210> 21
<211> 41
<212> DNA
<213> Artificial Sequence
<220>
<223> Primer for fungal detection
<400> 21
gcttcacacg ctgctccttt ttggagtcct cagcgataga t                 41

<210> 22
<211> 19
<212> DNA
<213> Artificial Sequence
<220>
<223> Primer for fungal detection
<400> 22
tgtagctggc tccattagt                                          19

<210> 23
<211> 41
<212> DNA
<213> Artificial Sequence
<220>
<223> Primer for fungal detection
<400> 23
ggggtagggg tcccaatcat ttttgcacac cttttgctct t                 41

<210> 24
<211> 22
<212> DNA
```

SEQUENCE LISTING

```
<213> Artificial Sequence
<220>
<223> Primer for fungal detection
<400> 24
tagctggatc tcagtgttat gc                                              22

<210> 25
<211> 19
<212> DNA
<213> Artificial Sequence
<220>
<223> Primer for fungal detection
<400> 25
ctcccatcca tgtctctgc                                                  19

<210> 26
<211> 18
<212> DNA
<213> Artificial Sequence
<220>
<223> Primer for fungal detection
<400> 26
aatgtgtgaa gcccgaag                                                   18

<210> 27
<211> 42
<212> DNA
<213> Artificial Sequence
<220>
<223> Primer for fungal detection
<400> 27
gcttccctga cggcttctct tttctcagag ttgccgttgt ag                        42

<210> 28
<211> 22
<212> DNA
<213> Artificial Sequence
<220>
<223> Primer for fungal detection
<400> 28
gtcgcagagg aatctaacat aa                                              22

<210> 29
<211> 44
<212> DNA
<213> Artificial Sequence
<220>
<223> Primer for fungal detection
<400> 29
aggaactgcg agtcggttat tgtttttaca ggcagaccat ctcc                      44

<210> 30
<211> 22
<212> DNA
<213> Artificial Sequence
<220>
<223> Primer for fungal detection
<400> 30
acagtactga cattctgcca at                                              22

<210> 31
<211> 19
<212> DNA
<213> Artificial Sequence
<220>
<223> Primer for fungal detection
<400> 31
acactccatc gctgtcaag                                                  19
```

SEQUENCE LISTING

```
<210> 32
<211> 20
<212> DNA
<213> Artificial Sequence
<220>
<223> Primer for fungal detection
<400> 32
tgaactccat ctcgtccata                                             20

<210> 33
<211> 18
<212> DNA
<213> Artificial Sequence
<220>
<223> Primer for fungal detection
<400> 33
tcgtatgagc accaagga                                               18

<210> 34
<211> 19
<212> DNA
<213> Artificial Sequence
<220>
<223> Primer for fungal detection
<400> 34
gatgttcaag cgtgtcagc                                              19

<210> 35
<211> 19
<212> DNA
<213> Artificial Sequence
<220>
<223> Primer for fungal detection
<400> 35
gctggccttg atgttgttc                                              19

<210> 36
<211> 42
<212> DNA
<213> Artificial Sequence
<220>
<223> Primer for fungal detection
<400> 36
cggtaactcg actgccatcc ttttccttac gacggaacat gg                    42

<210> 37
<211> 44
<212> DNA
<213> Artificial Sequence
<220>
<223> Primer for fungal detection
<400> 37
ccctttggtg ggatgtcaca attttctcgt cgtacttcgt tgag                  44

<210> 38
<211> 19
<212> DNA
<213> Artificial Sequence
<220>
<223> Primer for fungal detection
<400> 38
ttgaagtaga cgctcatgc                                              19

<210> 39
<211> 19
<212> DNA
<213> Artificial Sequence
<220>
<223> Primer for fungal detection
<400> 39
```

SEQUENCE LISTING

```
gtgctgcttt ctggtatga                                          19

<210> 40
<211> 18
<212> DNA
<213> Artificial Sequence
<220>
<223> Primer for fungal detection
<400> 40
cgttcaccgc tctgacat                                           18

<210> 41
<211> 19
<212> DNA
<213> Artificial Sequence
<220>
<223> Primer for fungal detection
<400> 41
cgctagaaat ggtctgcct                                          19

<210> 42
<211> 43
<212> DNA
<213> Artificial Sequence
<220>
<223> Primer for fungal detection
<400> 42
ttcgtcctgc ttgtggctct tttgccgttg tacctgtatc aat               43

<210> 43
<211> 41
<212> DNA
<213> Artificial Sequence
<220>
<223> Primer for fungal detection
<400> 43
ttgctgtcga gaccgtgctt tttgacccgt actgacttct t                 41

<210> 44
<211> 18
<212> DNA
<213> Artificial Sequence
<220>
<223> Primer for fungal detection
<400> 44
ggtaaccaaa tcggtgct                                           18

<210> 45
<211> 19
<212> DNA
<213> Artificial Sequence
<220>
<223> Primer for fungal detection
<400> 45
gcgagtcggt tattgaact                                          19

<210> 46
<211> 19
<212> DNA
<213> Artificial Sequence
<220>
<223> Primer for fungal detection
<400> 46
tttcgtcgca aaggtcact                                          19

<210> 47
<211> 21
<212> DNA
<213> Artificial Sequence
```

SEQUENCE LISTING

```
<220>
<223> Primer for fungal detection
<400> 47
aacaagcaag gctaacactc t                                        21

<210> 48
<211> 41
<212> DNA
<213> Artificial Sequence
<220>
<223> Primer for fungal detection
<400> 48
gggtttgacc gccgagtttt ttgcgtacaa ctccgatact c                  41

<210> 49
<211> 43
<212> DNA
<213> Artificial Sequence
<220>
<223> Primer for fungal detection
<400> 49
ggaatctggc aaaagggtgg atttttgctc actggagatg gtt                43

<210> 50
<211> 19
<212> DNA
<213> Artificial Sequence
<220>
<223> Primer for fungal detection
<400> 50
ttgaagtaga cgctcatgc                                           19

<210> 51
<211> 18
<212> DNA
<213> Artificial Sequence
<220>
<223> Primer for fungal detection
<400> 51
gctgctttct ggtacgaa                                            18

<210> 52
<211> 20
<212> DNA
<213> Artificial Sequence
<220>
<223> Primer for fungal detection
<400> 52
tcaccgctct gacatattgg                                          20

<210> 53
<211> 18
<212> DNA
<213> Artificial Sequence
<220>
<223> Primer for fungal detection
<400> 53
gctggagatg gtttgcct                                            18

<210> 54
<211> 42
<212> DNA
<213> Artificial Sequence
<220>
<223> Primer for fungal detection
<400> 54
ggagatcctc ggccacatgt tttcgaggta ccgttgtaac tg                 42

<210> 55
```

```
SEQUENCE LISTING
```

<211> 42
<212> DNA
<213> Artificial Sequence
<220>
<223> Primer for fungal detection
<400> 55
ttgctgtcga gaccgtgctt ttaccgtgat catccatcat tg         42

<210> 56
<211> 19
<212> DNA
<213> Artificial Sequence
<220>
<223> Primer for fungal detection
<400> 56
gacgaagtac gacgagttc                                   19

<210> 57
<211> 19
<212> DNA
<213> Artificial Sequence
<220>
<223> Primer for fungal detection
<400> 57
ctccacttct tcatggtcg                                   19

<210> 58
<211> 19
<212> DNA
<213> Artificial Sequence
<220>
<223> Primer for fungal detection
<400> 58
cgatagccgt ggtaaggtc                                   19

<210> 59
<211> 19
<212> DNA
<213> Artificial Sequence
<220>
<223> Primer for fungal detection
<400> 59
aggcagccat catgttctt                                   19

<210> 60
<211> 44
<212> DNA
<213> Artificial Sequence
<220>
<223> Primer for fungal detection
<400> 60
gcccaaccta gaaggcacta acttttcct cgacctcctt catg        44

<210> 61
<211> 41
<212> DNA
<213> Artificial Sequence
<220>
<223> Primer for fungal detection
<400> 61
ggtcaggtag cgaccgttgt tttgagttga cccagcagat g          41

<210> 62
<211> 18
<212> DNA
<213> Artificial Sequence
<220>
<223> Primer for fungal detection
<400> 62

SEQUENCE LISTING ttgtagggct caacaacc                                                      18

<210> 63
<211> 18
<212> DNA
<213> Artificial Sequence
<220>
<223> Primer for fungal detection
<400> 63
gacgcagttc tcgatgtc                                                      18

<210> 64
<211> 44
<212> DNA
<213> Artificial Sequence
<220>
<223> Primer for fungal detection
<400> 64
ggcacccttt tgatctccaa gattttggaa cgaccgagaa tgtg                         44

<210> 65
<211> 40
<212> DNA
<213> Artificial Sequence
<220>
<223> Primer for fungal detection
<400> 65
ataccggcac cggttccttt ttgatgcgag tgtcttcagg                              40

<210> 66
<211> 20
<212> DNA
<213> Artificial Sequence
<220>
<223> Primer for fungal detection
<400> 66
ccgtgaagaa taccccgatc                                                    20

<210> 67
<211> 18
<212> DNA
<213> Artificial Sequence
<220>
<223> Primer for fungal detection
<400> 67
ccgagcgagt gggtaatc                                                      18

<210> 68
<211> 22
<212> DNA
<213> Artificial Sequence
<220>
<223> Primer for fungal detection
<400> 68
aattagcaca acctggtaat ca                                                 22

<210> 69
<211> 22
<212> DNA
<213> Artificial Sequence
<220>
<223> Primer for fungal detection
<400> 69
acttaatcca ggagctctca ta                                                 22

<210> 70
<211> 48
<212> DNA
<213> Artificial Sequence
<220>

SEQUENCE LISTING

```
<223> Primer for fungal detection
<400> 70
gccatatctg gagcaccaat cattttaatg ttgttgtaac agcacatg        48

<210> 71
<211> 47
<212> DNA
<213> Artificial Sequence
<220>
<223> Primer for fungal detection
<400> 71
aatcaggtgc tggtacaggt tgttttaatc tactgaaggt cctgagt        47

<210> 72
<211> 22
<212> DNA
<213> Artificial Sequence
<220>
<223> Primer for fungal detection
<400> 72
aaccaccaat taatacaggc at                                   22

<210> 73
<211> 22
<212> DNA
<213> Artificial Sequence
<220>
<223> Primer for fungal detection
<400> 73
accattatca agtgtacaag ca                                   22

<210> 74
<211> 21
<212> DNA
<213> Artificial Sequence
<220>
<223> Primer for fungal detection
<400> 74
tgtacgatca ctgttagcat c                                    21

<210> 75
<211> 18
<212> DNA
<213> Artificial Sequence
<220>
<223> Primer for fungal detection
<400> 75
ctcgaccagt tcaagcag                                        18

<210> 76
<211> 41
<212> DNA
<213> Artificial Sequence
<220>
<223> Primer for fungal detection
<400> 76
ggcgtgccca tctttggtat tttgtgtcca cgaacctgaa g              41

<210> 77
<211> 43
<212> DNA
<213> Artificial Sequence
<220>
<223> Primer for fungal detection
<400> 77
ggtgacaggg tcctggtctt tttgtggctt gttaaggatg aca            43

<210> 78
<211> 18
```

SEQUENCE LISTING

```
<212> DNA
<213> Artificial Sequence
<220>
<223> Primer for fungal detection
<400> 78
ttgacatgtg ggagcacg                                              18

<210> 79
<211> 20
<212> DNA
<213> Artificial Sequence
<220>
<223> Primer for fungal detection
<400> 79
tcgtcgtgat aatgctgagg                                            20

<210> 80
<211> 19
<212> DNA
<213> Artificial Sequence
<220>
<223> Primer for fungal detection
<400> 80
cgttccagat gttctcgac                                             19

<210> 81
<211> 18
<212> DNA
<213> Artificial Sequence
<220>
<223> Primer for fungal detection
<400> 81
gtcaaggacg acgtaacg                                              18

<210> 82
<211> 47
<212> DNA
<213> Artificial Sequence
<220>
<223> Primer for fungal detection
<400> 82
gcgtactacc tccaggttcg tattttgagc attgttagta ccttcca              47

<210> 83
<211> 41
<212> DNA
<213> Artificial Sequence
<220>
<223> Primer for fungal detection
<400> 83
atgtccacgc cgaagatggt tttctgagca tcatcacgac g                    41

<210> 84
<211> 19
<212> DNA
<213> Artificial Sequence
<220>
<223> Primer for fungal detection
<400> 84
aacactgacg gatctgctt                                             19

<210> 85
<211> 18
<212> DNA
<213> Artificial Sequence
<220>
<223> Primer for fungal detection
<400> 85
tgacagggtc ctggtctt                                              18
```

SEQUENCE LISTING

```
<210> 86
<211> 18
<212> DNA
<213> Artificial Sequence
<220>
<223> Primer for fungal detection
<400> 86
caaacgagag tcccaaac                                              18

<210> 87
<211> 22
<212> DNA
<213> Artificial Sequence
<220>
<223> Primer for fungal detection
<400> 87
atccagtgtc tataatctgt ag                                         22

<210> 88
<211> 44
<212> DNA
<213> Artificial Sequence
<220>
<223> Primer for fungal detection
<400> 88
gagtcagttc gtatgctgtg agtttttaac agccaagagc aagc                 44

<210> 89
<211> 44
<212> DNA
<213> Artificial Sequence
<220>
<223> Primer for fungal detection
<400> 89
cgcaacacag ggcaccaact tttgtgcagt atgtaagaag tggt                 44

<210> 90
<211> 19
<212> DNA
<213> Artificial Sequence
<220>
<223> Primer for fungal detection
<400> 90
ggctactgag gaggtaggt                                             19

<210> 91
<211> 20
<212> DNA
<213> Artificial Sequence
<220>
<223> Primer for fungal detection
<400> 91
agaacagcac aaagagcaga                                            20
```

SEQUENCE LISTING

```
Sequence total quantity: 91
SEQ ID NO: 1            moltype = DNA   length = 912
FEATURE                 Location/Qualifiers
source                  1..912
                        mol_type = genomic DNA
                        organism = Sclerotinia homoeocarpa
SEQUENCE: 1
tagatctaca catggttctt acattatatt taggtcactt gatctacaag tgcggtggaa   60
ttgacaagcg tactattgaa aagttcgaga cggtatgact tctccacctt tctcttgcta  120
tcttttcccg tccttctcat cgagatcagt gtctgcgatc ttggtgctga tggatttatc  180
```

```
gggttgcgtt ttctctcatg cgcggagcat acatccgaat tctcaaccct tgaacatta    240
ccacattgcc tttccagaat ccctttgcta acccgttaat aggaagccaa ggagatggga    300
aagggttcct tcaagtacgc atgggttttg dacaagttga aggctgagcg tgagcgtggt    360
atcaccatcg acattgccct ctggaagttc gagacaccta agtacaatgt tactgtcatt    420
ggtatgtgta cgaattcttt atgccaactg aagtatatta acccattcgc agatgccccc    480
ggtcatcgtg atttcatcaa gaacatgatc actggtacct cccaagctga ttgtgccatt    540
cttatcatcg ctgccggtgt tggtgagttc gaggctggta tctccaagga tggtcagacc    600
cgtgagcacg ctcttcttgc gtacactctt ggtgttaagc aacttatcgt tgccatcaac    660
aagatggaca ccaccaagtg gtccaaggat cgtttcgagg aaatcatcaa ggagacaacc    720
aacttcatca agaaggttgg ctacaacgcc aagactgttc ccttcgtgcc gatctctgga    780
ttcgagggtg ataacatgat tgagccctca actaactgcc catggtacaa gggctgggag    840
agagagtcca aggagtctgg caaacacacc ggcaagaccc tcttgaggc catcgacagc    900
atggacctgc ct                                                        912

SEQ ID NO: 2           moltype = DNA   length = 629
FEATURE                Location/Qualifiers
misc_feature           1..629
                       note = Rhizoctonia solani AG2-2IIIB
source                 1..629
                       mol_type = genomic DNA
                       organism = Rhizoctonia solani
SEQUENCE: 2
tgtagctggc tccattagtt tggagcatgt gcacaccttt tgctcttttt ttaatccaca     60
cacacctgtg aacctgtgag gcagagacat ggatgggaga actttatttt actttaaaat    120
gaatgattgg gaccccctacc ccccccccc tctgtctact caactctaat ataaaccccaa   180
tttattttaa aatgaatgta atggatgtaa cgcatctaat actaagtttc aacaacggat    240
ctcttggctc tcgcatcgat gaagaacgca gcgaaatgcg ataagtaatg tgaattgcag    300
aattcagtga atcatcgaat cttttgaacgc accttgcgct ccttggtatt ccttggagca    360
tgcctgtttg agtatcatga aatcttcaaa gtaaacctttt tgttaactc aatttggttt    420
cactttggta ttggaggttc ttgcagcttc acacgctggt cctcttttgtt cattagctag    480
atctcagtgt tatgcttggt tcctctcggc gtgataaatt atctatcgct gaggactccc    540
gataaaaagg ttgccaagg taaatgcaga tgaaccgctt ctaatagtcc attgacttgg     600
acaataaaat aattattatt ttacgatct                                       629

SEQ ID NO: 3           moltype = DNA   length = 613
FEATURE                Location/Qualifiers
misc_feature           1..613
                       note = Microdochium nivale var. nivale
source                 1..613
                       mol_type = genomic DNA
                       organism = Microdochium nivale
SEQUENCE: 3
ggtaaccaaa tcggtgctgc tttctggtgc gtacacctcg actcgaagac gaccacgacc     60
ttcgcgacga aaatgaactc ggcagccaaa aacgtgccg tcgagaatct ttagtcgcag     120
aggaatctaa cataagggtg gagaccggca aggctaacac tatcttccct gatacaggca    180
gaccatctcc ggcgagcacg gtcttgacag cgatggagtg taagttcaat aaccgactcg    240
cagttcctg cgagagaccg cttccctgac ggcttctcgg gccagatgaa atgcaacagt    300
actgacattc tgccaatagc tacaacggca actctgagct ccagctcgag cgcatgagcg    360
tctacttcaa cgaggtatgt caccatgggc gacttcgggc ttcacacatt cggccagcta    420
ctaactgacc acccacataa cttaggcttc cggcaacaag tacgttcccc gcgccgtcct    480
cgtcgatctc gagcccggta ccatggatgc cgtccgtgct ggtcccttcg gccagctgtt    540
ccgtccgac aacttcgtct tcggtcagtc cggtgctggc aacaattggg ccaagggtca    600
ctacactgag ggt                                                        613

SEQ ID NO: 4           moltype = DNA   length = 455
FEATURE                Location/Qualifiers
source                 1..455
                       mol_type = genomic DNA
                       organism = Pythium aphanidermatum
SEQUENCE: 4
cttcagtgaa ctccatctcg tccataccct caccagtgta ccagtgcaag aaggccttac     60
gacggaacat ggccgtgaac tgctcgctga cacgcttgaa catctcctgg atggcagtcg    120
agttaccgat gaacgtggcg ctcatcttga dacccttttg tgggatgtca caaacgctgg    180
ccttgatgtt gttcgggatc cactcaacga agtacgacg agtgctgttc tgaacgttga    240
gcatctgctc gtcgacctcc ttggtgctca tacgaccacg aacatacaa gcggcggtca    300
ggtaacgacc gtgacgagga tcagcggcac acatcatgtt cttggcgtcg aactgctgct    360
gggtcagctc tggcaccgta agggcacggt actgctgcga ccgcgcgag gtgagcggag    420
cgaaaccgac catgaagaag tggaacgggg gaaaa                                455

SEQ ID NO: 5           moltype = DNA   length = 518
FEATURE                Location/Qualifiers
misc_feature           1..518
                       note = Gaeumannomyces graminis var. avenae
source                 1..518
                       mol_type = genomic DNA
                       organism = Gaeumannomyces graminis
SEQUENCE: 5
ttagtgaccc ttggcccagt tgttgccagc accagactgg ccgaaaacga agttgtcggg     60
gcggaacagc tggccgaagg gaccggcacg aacggcgtcc atggtgccgg gctcgagatc    120
```

```
gacgaggacg gcacggggga catgcttgtt gccggaggcc tggagcggaa aggttatggg   180
tcagaataca tgatacgaag gtgggaaata ccgctgcta atgccggaca gaagcttcaa    240
ctcagggcct gtctgcatac ctcgttgaag tagacgctca tgcgctcgag ctggagctcc   300
gaggtgccgt tgtacctgta tcaatatgtc agagcggtga acggacggcg ggccgagcca   360
caagcaggac gaaatacgta cacgccattg ctgtcgagac cgtgctcgct agaaatggtc   420
tgcctgtcaa agaagtcagt acgggtcacg gcagtcgga gtcgtggtcg gcggcggatc    480
gtcgcgcggc gtcgtttcat accagaaagc agcaccgt                          518

SEQ ID NO: 6            moltype = DNA   length = 550
FEATURE                 Location/Qualifiers
misc_feature            1..550
                        note = Microdochium nivale var.
source                  1..550
                        mol_type = genomic DNA
                        organism = Microdochium nivale
SEQUENCE: 6
ggtaaccaaa tcggtgctgc tttctggtgc gtacaactcc gatactcaac gacggccgca   60
gtgacctttg cgacgaaaac aaactcggcg gtcaaacccg tatcgccgaa aatcttcggt   120
cgcagaggaa tctggcaaaa gggtggaaat aaacaagcaa ggctaacact ctcttccccg   180
acacaggcaa accatctcca gtgagcacgg tctcgacagc aatggcgtgt aagttcaata   240
accgactcgc acttcttgcg aaaggccact tccctgatgg cgtatcacgc cagatgaaat   300
acacaagtac tgacatcctg tcaatagcta caacggcacc tccgagctcc agctcgagcg   360
catgagtgtc tacttcaatg aggcttccgg caacaagtac gttcctcgtg ccgtcctgt    420
cgatctcgag cccggtacca tggatgccgt ccgtgctggt cccttcggcc agctgttccg   480
ccccgacaac ttcgtcttcg gtcagtccgg tgctggcaac aactgggcca aggtcactca   540
cactgagggt                                                          550

SEQ ID NO: 7            moltype = DNA   length = 485
FEATURE                 Location/Qualifiers
source                  1..485
                        mol_type = genomic DNA
                        organism = Magnaporthe poae
SEQUENCE: 7
ttagtgaccc ttggcccagt tgttgccagc accggactgg ccgaaaacga agttgtcggg   60
gcggaacagc tggccgaagg gaccagcacg gacagcatcc atggtgccgg gctcgagatc   120
gaccaggacg gcacggggga catgcttgtt gccggaggcc tagagcgcgg ggaggcaatg   180
gtgtcagaaa acaacacgt ggttgcgaaa gagagacgcg ttcggagtct atctgcatac    240
ctcgttgaag tagacgctca tgcgctcgag ctggagcgagt gaggtaccgt tgtaactgca   300
ccaatatgtc agagcggtga acggacatgt ggccgaggat ctcccaaaca gaatacatac   360
actccattgc tgtcgagacc gtgctcgctg gagatggttt gcctgcccag gaagtcagta   420
tcaatgatgg atgatcacgg tcgtggtggg tgcgagcggt ggttcgtacc agaaagcagc   480
accgt                                                               485

SEQ ID NO: 8            moltype = DNA   length = 539
FEATURE                 Location/Qualifiers
misc_feature            1..539
                        note = Gaeumannomyces graminis var. avenae
source                  1..539
                        mol_type = genomic DNA
                        organism = Gaeumannomyces graminis
SEQUENCE: 8
cctcagtgaa ctccatctcg tccatacccct cgccagtgta ccaatgaagg aaagccttgc   60
gcctgaacat ggcagtgaac tgctcaccaa cacgcttgaa gagctcttgt atggcagtcg   120
agtttccgat gaaggtcgac gacatcttca ggccccgggg agggattgag cagagggcgg   180
tctggatgtt gttgggaatc cactcgacga agtacgacga gttcttgttc tggatgttgc   240
gcatctggtc ctcgacctcc ttcatggaga ccttaccacg gctatcgcac acagggatgg   300
ttagttagtg ccttctaggt tgggcatatt aaatgggcca gataaataag cccaatgcct   360
agatgcaaga ctcacaaaat agcagagcag gtcaggtagc gaccgttgcg gaagtccgag   420
gcagccatca tgttcttggg gtcgaacatc tgctgggtca actcgggcac cgtgacggcg   480
cggaatgagt gggcgccgcg gctagtcagg ggagcgaagc cgaccatgaa gaagtggag    539

SEQ ID NO: 9            moltype = DNA   length = 236
FEATURE                 Location/Qualifiers
misc_feature            1..236
                        note = Rhizoctonia solani AG2-2IV
source                  1..236
                        mol_type = genomic DNA
                        organism = Rhizoctonia solani
SEQUENCE: 9
gttgtagggc tcaacaaccg tgtcggagac cttgggggaa ggaacgaccg agaatgtgca   60
catcatacga tcgggtgtatt cttcacggat cttggagatc aaaagggtgc ccataccggc   120
accggttcct ccaccgagcg agtgggtaat ctggaagccc tgaagacact cgcatccctc   180
ggcctctttg cgcgcgacat cgagaactgc gtcaacaagc tcggcacctt cggtgt        236

SEQ ID NO: 10           moltype = DNA   length = 604
FEATURE                 Location/Qualifiers
source                  1..604
                        mol_type = genomic DNA
                        organism = Pythium aphanidermatum
```

```
SEQUENCE: 10
tgcttttca   ggtgtagttg   gtacaacttt   atctgtttta   attagaatgg   aattagcaca    60
acctggtaat  caaatttta   tgggaaatca   tcaattatat   aatgttgttg   taacagcaca   120
tgcttttata  atgattttct   tcatggttat   gcctgtatta   attggtggtt   ttggtaactg   180
gtttattcct  ttaatgattg   gtgctccaga   tatggctttc   cctagaatga   ataatattag   240
tttttggtta  ttacctcctt   cattattatt   attagtatca   tctgctatag   tagaatcagg   300
tgctggtaca  ggttggactg   tatatccacc   attatcaagt   gtacaagcac   actcaggacc   360
ttcagtagat  ttagctattt   ttagtttaca   tttatctggt   atttcttcat   tattaggtgc   420
tattaatttt  ttatcaacta   tttataatat   gagagctcct   ggattaagtt   ttcatagatt   480
gccattattt  gtttggtctg   tttttattac   agctttttta   ttattgttaa   cattaccagt   540
attagcaggt  gctattacaa   tgttattaac   agatagaaat   ttaaatactt   cttttatga    600
tcct                                                                         604

SEQ ID NO: 11              moltype = DNA   length = 657
FEATURE                    Location/Qualifiers
source                     1..657
                           mol_type = genomic DNA
                           organism = Colletotrichum graminicola
SEQUENCE: 11
aatattctcg  acatatgcag   cctttccgtt   gagatactat   gtacgatcac   tgttagcatc    60
tcttttcaaa  aaaggtcttg   ttggtgtcca   cgaacctgaa   ggtagtacgc   gtgctccac   120
atgtcaatac  caaagatggg   cacgcccttg   gtgacaggtt   cctggtcttt   cgtcgtgata  180
atgctgaggc  ccgttatgtc   atccttaaca   agccaccccc   agccgctacc   ggtgatccc   240
agcagcgtgg  tgttgaaagc   ctgcttgaac   tggtcgagcc   cgcccagac   gcgggtgatc   300
tcggcgacga  gctttggcgc   cgcatcgggc   gaggcatcac   cgctcgaggc   tggggaaagg   360
ttctcccaga  ataggagatg   gttgatgtgg   ccgccgccgt   tgaagtttag   ggccgcgagg   420
acggcgatgc  gattctggag   cgggtttgca   ttgtaagtct   cgatggcctt   gttcagattt   480
gtaacgtatg  cttgatggct   gtaggtggct   tcatgtcaac   tctcttcttc   gctgcttcat   540
atttcatggt  tatctcactg   tttgctgtgg   tgcagctcca   tgatctgagc   tgagatgtga   600
ggctcgaggg  cctgcaggag   gggtcagcgg   gcgcgatcgc   gagcacgagt   aagggat    657

SEQ ID NO: 12              moltype = DNA   length = 663
FEATURE                    Location/Qualifiers
source                     1..663
                           mol_type = genomic DNA
                           organism = Colletotrichum cereale
SEQUENCE: 12
cgttccagat  gttctcgacg   tacgccgctt   ttccattgag   gtactgaggc   cgagcattgt    60
tagtaccttc  caacaaagca   gatccgtcag   tgtttacgaa   cctggaggta   gtacgcgtgc   120
tcccacatgt  ccacgccgaa   gatgggcacg   cccttggtga   cagggtcctg   gtctttcgtc   180
gtgatgatgc  tcagacccgt   tacgtcgtcc   ttgaccagcc   atcccagcc   gctgccggtg   240
atacccagaa  gcgtggcgtt   gaaagcctgc   ttgaactggt   cgagcccgcc   ccagacccgg   300
gcgatctcag  cgacgagctt   cggcgcggcg   tctggcgagg   cgtctgggct   cgcaggcagg   360
gacaggtttt  cccagaagag   ggagtggttg   atgtggccgc   cgccgttgaa   gttgagggct   420
gggaggacgg  cgatgcggtt   ctggagggg   ttcgcgttgt   aggtctcgac   ggccttgttt   480
agatttgtaa  cgtatgcttc   gtgactgcga   tggtttgatt   tcaaccctgt   tcttcttttgg   540
tttctagtgc  ctagctctct   tactgtttgc   tgtggtgcag   ctccatgatc   tgggctgaga   600
tgtgcggctc  gagagcctgg   aagaggggtc   agcgggtgcg   accgcgaaca   caagtacggg   660
gat                                                                          663

SEQ ID NO: 13              moltype = DNA   length = 703
FEATURE                    Location/Qualifiers
misc_feature               1..703
                           note = Pythium ultimum var. ultimum
source                     1..703
                           mol_type = genomic DNA
                           organism = Pythium ultimum
SEQUENCE: 13
tcagaagaaa  ggtttcctac   ctcagaacagc  gtacgccatc   ctttacttc   atttcgcgct    60
ggggtttcca  caccctaaca   cttgcacaca   tgttagactc   cttggtccgt   gtttcaagac   120
gggccgaatc  gctccattc   gtcaaagtcc   cgaacggcaa   agttactct   agatctcaat   180
cgaccaatca  ctccgtcagc   atagcaagct   atccaaacag   gtaaccaaac   gagagtccca   240
aacactttaa  agcacattgt   aggcacctca   gtcccaacca   cgacaactaa   ctaccaagat   300
ataacagcca  agagcaagct   cctaacctac   ctcctcagta   gccattctc   acagcatagt   360
aactgactct  gacgtcccac   cgcaacacag   ggcaccaaca   agcaaacgaa   gaacagcaca   420
aagagcagaa  aaccacttct   tacatactgc   acgacctac   tcgccaatga   aatatgctac   480
agattataga  cactggatac   gattcgcttc   cctttcagca   gtttcaggta   ctctttaact   540
ctctttttcaa  agttctttc   atcttttcct   cacggtactt   gttcgctatc   ggtctcgcac   600
caatatttag  cttagatgg   aatttaccac   ctactttgcg   ctgcagtccc   aaacaacgcg   660
actcaaagaa  aacgtgtcgt   acgcacaagc   tactcaggca   caa                       703

SEQ ID NO: 14              moltype = DNA   length = 18
FEATURE                    Location/Qualifiers
misc_feature               1..18
                           note = Primer for fungal detection
source                     1..18
                           mol_type = other DNA
                           organism = synthetic construct
SEQUENCE: 14
```

```
gctcagcctt caacttgt                                              18

SEQ ID NO: 15          moltype = DNA   length = 45
FEATURE                Location/Qualifiers
misc_feature           1..45
                       note = Primer for fungal detection
source                 1..45
                       mol_type = other DNA
                       organism = synthetic construct
SEQUENCE: 15
gcctttccag aatcccttttg cttttttgaag gaacccttttc ccatc             45

SEQ ID NO: 16          moltype = DNA   length = 19
FEATURE                Location/Qualifiers
misc_feature           1..19
                       note = Primer for fungal detection
source                 1..19
                       mol_type = other DNA
                       organism = synthetic construct
SEQUENCE: 16
ggtggaattg acaagcgta                                             19

SEQ ID NO: 17          moltype = DNA   length = 43
FEATURE                Location/Qualifiers
misc_feature           1..43
                       note = Primer for fungal detection
source                 1..43
                       mol_type = other DNA
                       organism = synthetic construct
SEQUENCE: 17
atgctccgcg catgagagtt ttcttctcat cgagatcagt gtc                  43

SEQ ID NO: 18          moltype = DNA   length = 21
FEATURE                Location/Qualifiers
misc_feature           1..21
                       note = Primer for fungal detection
source                 1..21
                       mol_type = other DNA
                       organism = synthetic construct
SEQUENCE: 18
ccgttaatag gaagccaagg a                                          21

SEQ ID NO: 19          moltype = DNA   length = 19
FEATURE                Location/Qualifiers
misc_feature           1..19
                       note = Primer for fungal detection
source                 1..19
                       mol_type = other DNA
                       organism = synthetic construct
SEQUENCE: 19
tccatcagca ccaagatcg                                             19

SEQ ID NO: 20          moltype = DNA   length = 20
FEATURE                Location/Qualifiers
misc_feature           1..20
                       note = Primer for fungal detection
source                 1..20
                       mol_type = other DNA
                       organism = synthetic construct
SEQUENCE: 20
atttaccttg gccaaccttt                                            20

SEQ ID NO: 21          moltype = DNA   length = 41
FEATURE                Location/Qualifiers
misc_feature           1..41
                       note = Primer for fungal detection
source                 1..41
                       mol_type = other DNA
                       organism = synthetic construct
SEQUENCE: 21
gcttcacacg ctgctccttt ttggagtcct cagcgataga t                    41

SEQ ID NO: 22          moltype = DNA   length = 19
FEATURE                Location/Qualifiers
misc_feature           1..19
                       note = Primer for fungal detection
source                 1..19
                       mol_type = other DNA
                       organism = synthetic construct
```

-continued

```
SEQUENCE: 22
tgtagctggc tccattagt                                                    19

SEQ ID NO: 23           moltype = DNA   length = 41
FEATURE                 Location/Qualifiers
misc_feature            1..41
                        note = Primer for fungal detection
source                  1..41
                        mol_type = other DNA
                        organism = synthetic construct
SEQUENCE: 23
ggggtagggg tcccaatcat ttttgcacac cttttgctct t                            41

SEQ ID NO: 24           moltype = DNA   length = 22
FEATURE                 Location/Qualifiers
misc_feature            1..22
                        note = Primer for fungal detection
source                  1..22
                        mol_type = other DNA
                        organism = synthetic construct
SEQUENCE: 24
tagctggatc tcagtgttat gc                                                22

SEQ ID NO: 25           moltype = DNA   length = 19
FEATURE                 Location/Qualifiers
misc_feature            1..19
                        note = Primer for fungal detection
source                  1..19
                        mol_type = other DNA
                        organism = synthetic construct
SEQUENCE: 25
ctcccatcca tgtctctgc                                                    19

SEQ ID NO: 26           moltype = DNA   length = 18
FEATURE                 Location/Qualifiers
misc_feature            1..18
                        note = Primer for fungal detection
source                  1..18
                        mol_type = other DNA
                        organism = synthetic construct
SEQUENCE: 26
aatgtgtgaa gcccgaag                                                     18

SEQ ID NO: 27           moltype = DNA   length = 42
FEATURE                 Location/Qualifiers
misc_feature            1..42
                        note = Primer for fungal detection
source                  1..42
                        mol_type = other DNA
                        organism = synthetic construct
SEQUENCE: 27
gcttccctga cggcttctct tttctcagag ttgccgttgt ag                           42

SEQ ID NO: 28           moltype = DNA   length = 22
FEATURE                 Location/Qualifiers
misc_feature            1..22
                        note = Primer for fungal detection
source                  1..22
                        mol_type = other DNA
                        organism = synthetic construct
SEQUENCE: 28
gtcgcagagg aatctaacat aa                                                22

SEQ ID NO: 29           moltype = DNA   length = 44
FEATURE                 Location/Qualifiers
misc_feature            1..44
                        note = Primer for fungal detection
source                  1..44
                        mol_type = other DNA
                        organism = synthetic construct
SEQUENCE: 29
aggaactgcg agtcggttat tgttttttaca ggcagaccat ctcc                        44

SEQ ID NO: 30           moltype = DNA   length = 22
FEATURE                 Location/Qualifiers
misc_feature            1..22
                        note = Primer for fungal detection
source                  1..22
                        mol_type = other DNA
```

```
                             organism = synthetic construct
SEQUENCE: 30
acagtactga cattctgcca at                                               22

SEQ ID NO: 31            moltype = DNA  length = 19
FEATURE                  Location/Qualifiers
misc_feature             1..19
                         note = Primer for fungal detection
source                   1..19
                         mol_type = other DNA
                         organism = synthetic construct
SEQUENCE: 31
acactccatc gctgtcaag                                                   19

SEQ ID NO: 32            moltype = DNA  length = 20
FEATURE                  Location/Qualifiers
misc_feature             1..20
                         note = Primer for fungal detection
source                   1..20
                         mol_type = other DNA
                         organism = synthetic construct
SEQUENCE: 32
tgaactccat ctcgtccata                                                  20

SEQ ID NO: 33            moltype = DNA  length = 18
FEATURE                  Location/Qualifiers
misc_feature             1..18
                         note = Primer for fungal detection
source                   1..18
                         mol_type = other DNA
                         organism = synthetic construct
SEQUENCE: 33
tcgtatgagc accaagga                                                    18

SEQ ID NO: 34            moltype = DNA  length = 19
FEATURE                  Location/Qualifiers
misc_feature             1..19
                         note = Primer for fungal detection
source                   1..19
                         mol_type = other DNA
                         organism = synthetic construct
SEQUENCE: 34
gatgttcaag cgtgtcagc                                                   19

SEQ ID NO: 35            moltype = DNA  length = 19
FEATURE                  Location/Qualifiers
misc_feature             1..19
                         note = Primer for fungal detection
source                   1..19
                         mol_type = other DNA
                         organism = synthetic construct
SEQUENCE: 35
gctggccttg atgttgttc                                                   19

SEQ ID NO: 36            moltype = DNA  length = 42
FEATURE                  Location/Qualifiers
misc_feature             1..42
                         note = Primer for fungal detection
source                   1..42
                         mol_type = other DNA
                         organism = synthetic construct
SEQUENCE: 36
cggtaactcg actgccatcc ttttccttac gacggaacat gg                         42

SEQ ID NO: 37            moltype = DNA  length = 44
FEATURE                  Location/Qualifiers
misc_feature             1..44
                         note = Primer for fungal detection
source                   1..44
                         mol_type = other DNA
                         organism = synthetic construct
SEQUENCE: 37
cccttTggtg ggatgtcaca attttctcgt cgtacttcgt tgag                       44

SEQ ID NO: 38            moltype = DNA  length = 19
FEATURE                  Location/Qualifiers
misc_feature             1..19
                         note = Primer for fungal detection
source                   1..19
```

```
                        mol_type = other DNA
                        organism = synthetic construct
SEQUENCE: 38
ttgaagtaga cgctcatgc                                                      19

SEQ ID NO: 39           moltype = DNA  length = 19
FEATURE                 Location/Qualifiers
misc_feature            1..19
                        note = Primer for fungal detection
source                  1..19
                        mol_type = other DNA
                        organism = synthetic construct
SEQUENCE: 39
gtgctgcttt ctggtatga                                                      19

SEQ ID NO: 40           moltype = DNA  length = 18
FEATURE                 Location/Qualifiers
misc_feature            1..18
                        note = Primer for fungal detection
source                  1..18
                        mol_type = other DNA
                        organism = synthetic construct
SEQUENCE: 40
cgttcaccgc tctgacat                                                       18

SEQ ID NO: 41           moltype = DNA  length = 19
FEATURE                 Location/Qualifiers
misc_feature            1..19
                        note = Primer for fungal detection
source                  1..19
                        mol_type = other DNA
                        organism = synthetic construct
SEQUENCE: 41
cgctagaaat ggtctgcct                                                      19

SEQ ID NO: 42           moltype = DNA  length = 43
FEATURE                 Location/Qualifiers
misc_feature            1..43
                        note = Primer for fungal detection
source                  1..43
                        mol_type = other DNA
                        organism = synthetic construct
SEQUENCE: 42
ttcgtcctgc ttgtggctct tttgccgttg tacctgtatc aat                           43

SEQ ID NO: 43           moltype = DNA  length = 41
FEATURE                 Location/Qualifiers
misc_feature            1..41
                        note = Primer for fungal detection
source                  1..41
                        mol_type = other DNA
                        organism = synthetic construct
SEQUENCE: 43
ttgctgtcga gaccgtgctt tttgacccgt actgacttct t                             41

SEQ ID NO: 44           moltype = DNA  length = 18
FEATURE                 Location/Qualifiers
misc_feature            1..18
                        note = Primer for fungal detection
source                  1..18
                        mol_type = other DNA
                        organism = synthetic construct
SEQUENCE: 44
ggtaaccaaa tcggtgct                                                       18

SEQ ID NO: 45           moltype = DNA  length = 19
FEATURE                 Location/Qualifiers
misc_feature            1..19
                        note = Primer for fungal detection
source                  1..19
                        mol_type = other DNA
                        organism = synthetic construct
SEQUENCE: 45
gcgagtcggt tattgaact                                                      19

SEQ ID NO: 46           moltype = DNA  length = 19
FEATURE                 Location/Qualifiers
misc_feature            1..19
                        note = Primer for fungal detection
```

```
source                   1..19
                         mol_type = other DNA
                         organism = synthetic construct
SEQUENCE: 46
tttcgtcgca aaggtcact                                                    19

SEQ ID NO: 47            moltype = DNA  length = 21
FEATURE                  Location/Qualifiers
misc_feature             1..21
                         note = Primer for fungal detection
source                   1..21
                         mol_type = other DNA
                         organism = synthetic construct
SEQUENCE: 47
aacaagcaag gctaacactc t                                                 21

SEQ ID NO: 48            moltype = DNA  length = 41
FEATURE                  Location/Qualifiers
misc_feature             1..41
                         note = Primer for fungal detection
source                   1..41
                         mol_type = other DNA
                         organism = synthetic construct
SEQUENCE: 48
gggtttgacc gccgagtttt ttgcgtacaa ctccgatact c                           41

SEQ ID NO: 49            moltype = DNA  length = 43
FEATURE                  Location/Qualifiers
misc_feature             1..43
                         note = Primer for fungal detection
source                   1..43
                         mol_type = other DNA
                         organism = synthetic construct
SEQUENCE: 49
ggaatctggc aaaagggtgg attttttgctc actggagatg gtt                        43

SEQ ID NO: 50            moltype = DNA  length = 19
FEATURE                  Location/Qualifiers
misc_feature             1..19
                         note = Primer for fungal detection
source                   1..19
                         mol_type = other DNA
                         organism = synthetic construct
SEQUENCE: 50
ttgaagtaga cgctcatgc                                                    19

SEQ ID NO: 51            moltype = DNA  length = 18
FEATURE                  Location/Qualifiers
misc_feature             1..18
                         note = Primer for fungal detection
source                   1..18
                         mol_type = other DNA
                         organism = synthetic construct
SEQUENCE: 51
gctgctttct ggtacgaa                                                     18

SEQ ID NO: 52            moltype = DNA  length = 20
FEATURE                  Location/Qualifiers
misc_feature             1..20
                         note = Primer for fungal detection
source                   1..20
                         mol_type = other DNA
                         organism = synthetic construct
SEQUENCE: 52
tcaccgctct gacatattgg                                                   20

SEQ ID NO: 53            moltype = DNA  length = 18
FEATURE                  Location/Qualifiers
misc_feature             1..18
                         note = Primer for fungal detection
source                   1..18
                         mol_type = other DNA
                         organism = synthetic construct
SEQUENCE: 53
gctggagatg gtttgcct                                                     18

SEQ ID NO: 54            moltype = DNA  length = 42
FEATURE                  Location/Qualifiers
misc_feature             1..42
```

```
                    note = Primer for fungal detection
source              1..42
                    mol_type = other DNA
                    organism = synthetic construct
SEQUENCE: 54
ggagatcctc ggccacatgt tttcgaggta ccgttgtaac tg                          42

SEQ ID NO: 55       moltype = DNA  length = 42
FEATURE             Location/Qualifiers
misc_feature        1..42
                    note = Primer for fungal detection
source              1..42
                    mol_type = other DNA
                    organism = synthetic construct
SEQUENCE: 55
ttgctgtcga gaccgtgctt ttaccgtgat catccatcat tg                          42

SEQ ID NO: 56       moltype = DNA  length = 19
FEATURE             Location/Qualifiers
misc_feature        1..19
                    note = Primer for fungal detection
source              1..19
                    mol_type = other DNA
                    organism = synthetic construct
SEQUENCE: 56
gacgaagtac gacgagttc                                                    19

SEQ ID NO: 57       moltype = DNA  length = 19
FEATURE             Location/Qualifiers
misc_feature        1..19
                    note = Primer for fungal detection
source              1..19
                    mol_type = other DNA
                    organism = synthetic construct
SEQUENCE: 57
ctccacttct tcatggtcg                                                    19

SEQ ID NO: 58       moltype = DNA  length = 19
FEATURE             Location/Qualifiers
misc_feature        1..19
                    note = Primer for fungal detection
source              1..19
                    mol_type = other DNA
                    organism = synthetic construct
SEQUENCE: 58
cgatagccgt ggtaaggtc                                                    19

SEQ ID NO: 59       moltype = DNA  length = 19
FEATURE             Location/Qualifiers
misc_feature        1..19
                    note = Primer for fungal detection
source              1..19
                    mol_type = other DNA
                    organism = synthetic construct
SEQUENCE: 59
aggcagccat catgttctt                                                    19

SEQ ID NO: 60       moltype = DNA  length = 44
FEATURE             Location/Qualifiers
misc_feature        1..44
                    note = Primer for fungal detection
source              1..44
                    mol_type = other DNA
                    organism = synthetic construct
SEQUENCE: 60
gcccaaccta gaaggcacta acttttttcct cgacctcctt catg                       44

SEQ ID NO: 61       moltype = DNA  length = 41
FEATURE             Location/Qualifiers
misc_feature        1..41
                    note = Primer for fungal detection
source              1..41
                    mol_type = other DNA
                    organism = synthetic construct
SEQUENCE: 61
ggtcaggtag cgaccgttgt tttgagttga cccagcagat g                           41

SEQ ID NO: 62       moltype = DNA  length = 18
FEATURE             Location/Qualifiers
```

```
misc_feature            1..18
                        note = Primer for fungal detection
source                  1..18
                        mol_type = other DNA
                        organism = synthetic construct
SEQUENCE: 62
ttgtagggct caacaacc                                                 18

SEQ ID NO: 63           moltype = DNA   length = 18
FEATURE                 Location/Qualifiers
misc_feature            1..18
                        note = Primer for fungal detection
source                  1..18
                        mol_type = other DNA
                        organism = synthetic construct
SEQUENCE: 63
gacgcagttc tcgatgtc                                                 18

SEQ ID NO: 64           moltype = DNA   length = 44
FEATURE                 Location/Qualifiers
misc_feature            1..44
                        note = Primer for fungal detection
source                  1..44
                        mol_type = other DNA
                        organism = synthetic construct
SEQUENCE: 64
ggcacccttt tgatctccaa gattttggaa cgaccgagaa tgtg                    44

SEQ ID NO: 65           moltype = DNA   length = 40
FEATURE                 Location/Qualifiers
misc_feature            1..40
                        note = Primer for fungal detection
source                  1..40
                        mol_type = other DNA
                        organism = synthetic construct
SEQUENCE: 65
ataccggcac cggttccttt ttgatgcgag tgtcttcagg                         40

SEQ ID NO: 66           moltype = DNA   length = 20
FEATURE                 Location/Qualifiers
misc_feature            1..20
                        note = Primer for fungal detection
source                  1..20
                        mol_type = other DNA
                        organism = synthetic construct
SEQUENCE: 66
ccgtgaagaa taccccgatc                                               20

SEQ ID NO: 67           moltype = DNA   length = 18
FEATURE                 Location/Qualifiers
misc_feature            1..18
                        note = Primer for fungal detection
source                  1..18
                        mol_type = other DNA
                        organism = synthetic construct
SEQUENCE: 67
ccgagcgagt gggtaatc                                                 18

SEQ ID NO: 68           moltype = DNA   length = 22
FEATURE                 Location/Qualifiers
misc_feature            1..22
                        note = Primer for fungal detection
source                  1..22
                        mol_type = other DNA
                        organism = synthetic construct
SEQUENCE: 68
aattagcaca acctggtaat ca                                            22

SEQ ID NO: 69           moltype = DNA   length = 22
FEATURE                 Location/Qualifiers
misc_feature            1..22
                        note = Primer for fungal detection
source                  1..22
                        mol_type = other DNA
                        organism = synthetic construct
SEQUENCE: 69
acttaatcca ggagctctca ta                                            22

SEQ ID NO: 70           moltype = DNA   length = 48
```

```
FEATURE                 Location/Qualifiers
misc_feature            1..48
                        note = Primer for fungal detection
source                  1..48
                        mol_type = other DNA
                        organism = synthetic construct
SEQUENCE: 70
gccatatctg gagcaccaat cattttaatg ttgttgtaac agcacatg             48

SEQ ID NO: 71           moltype = DNA   length = 47
FEATURE                 Location/Qualifiers
misc_feature            1..47
                        note = Primer for fungal detection
source                  1..47
                        mol_type = other DNA
                        organism = synthetic construct
SEQUENCE: 71
aatcaggtgc tggtacaggt tgttttaatc tactgaaggt cctgagt              47

SEQ ID NO: 72           moltype = DNA   length = 22
FEATURE                 Location/Qualifiers
misc_feature            1..22
                        note = Primer for fungal detection
source                  1..22
                        mol_type = other DNA
                        organism = synthetic construct
SEQUENCE: 72
aaccaccaat taatacaggc at                                         22

SEQ ID NO: 73           moltype = DNA   length = 22
FEATURE                 Location/Qualifiers
misc_feature            1..22
                        note = Primer for fungal detection
source                  1..22
                        mol_type = other DNA
                        organism = synthetic construct
SEQUENCE: 73
accattatca agtgtacaag ca                                         22

SEQ ID NO: 74           moltype = DNA   length = 21
FEATURE                 Location/Qualifiers
misc_feature            1..21
                        note = Primer for fungal detection
source                  1..21
                        mol_type = other DNA
                        organism = synthetic construct
SEQUENCE: 74
tgtacgatca ctgttagcat c                                          21

SEQ ID NO: 75           moltype = DNA   length = 18
FEATURE                 Location/Qualifiers
misc_feature            1..18
                        note = Primer for fungal detection
source                  1..18
                        mol_type = other DNA
                        organism = synthetic construct
SEQUENCE: 75
ctcgaccagt tcaagcag                                              18

SEQ ID NO: 76           moltype = DNA   length = 41
FEATURE                 Location/Qualifiers
misc_feature            1..41
                        note = Primer for fungal detection
source                  1..41
                        mol_type = other DNA
                        organism = synthetic construct
SEQUENCE: 76
ggcgtgccca tctttggtat tttgtgtcca cgaacctgaa g                    41

SEQ ID NO: 77           moltype = DNA   length = 43
FEATURE                 Location/Qualifiers
misc_feature            1..43
                        note = Primer for fungal detection
source                  1..43
                        mol_type = other DNA
                        organism = synthetic construct
SEQUENCE: 77
ggtgacaggg tcctggtctt tttgtggctt gttaaggatg aca                  43
```

```
SEQ ID NO: 78              moltype = DNA   length = 18
FEATURE                    Location/Qualifiers
misc_feature               1..18
                           note = Primer for fungal detection
source                     1..18
                           mol_type = other DNA
                           organism = synthetic construct
SEQUENCE: 78
ttgacatgtg ggagcacg                                                          18

SEQ ID NO: 79              moltype = DNA   length = 20
FEATURE                    Location/Qualifiers
misc_feature               1..20
                           note = Primer for fungal detection
source                     1..20
                           mol_type = other DNA
                           organism = synthetic construct
SEQUENCE: 79
tcgtcgtgat aatgctgagg                                                        20

SEQ ID NO: 80              moltype = DNA   length = 19
FEATURE                    Location/Qualifiers
misc_feature               1..19
                           note = Primer for fungal detection
source                     1..19
                           mol_type = other DNA
                           organism = synthetic construct
SEQUENCE: 80
cgttccagat gttctcgac                                                         19

SEQ ID NO: 81              moltype = DNA   length = 18
FEATURE                    Location/Qualifiers
misc_feature               1..18
                           note = Primer for fungal detection
source                     1..18
                           mol_type = other DNA
                           organism = synthetic construct
SEQUENCE: 81
gtcaaggacg acgtaacg                                                          18

SEQ ID NO: 82              moltype = DNA   length = 47
FEATURE                    Location/Qualifiers
misc_feature               1..47
                           note = Primer for fungal detection
source                     1..47
                           mol_type = other DNA
                           organism = synthetic construct
SEQUENCE: 82
gcgtactacc tccaggttcg tattttgagc attgttagta ccttcca                          47

SEQ ID NO: 83              moltype = DNA   length = 41
FEATURE                    Location/Qualifiers
misc_feature               1..41
                           note = Primer for fungal detection
source                     1..41
                           mol_type = other DNA
                           organism = synthetic construct
SEQUENCE: 83
atgtccacgc cgaagatggt tttctgagca tcatcacgac g                                41

SEQ ID NO: 84              moltype = DNA   length = 19
FEATURE                    Location/Qualifiers
misc_feature               1..19
                           note = Primer for fungal detection
source                     1..19
                           mol_type = other DNA
                           organism = synthetic construct
SEQUENCE: 84
aacactgacg gatctgctt                                                         19

SEQ ID NO: 85              moltype = DNA   length = 18
FEATURE                    Location/Qualifiers
misc_feature               1..18
                           note = Primer for fungal detection
source                     1..18
                           mol_type = other DNA
                           organism = synthetic construct
SEQUENCE: 85
tgacagggtc ctggtctt                                                          18
```

-continued

```
SEQ ID NO: 86           moltype = DNA  length = 18
FEATURE                 Location/Qualifiers
misc_feature            1..18
                        note = Primer for fungal detection
source                  1..18
                        mol_type = other DNA
                        organism = synthetic construct
SEQUENCE: 86
caaacgagag tcccaaac                                            18

SEQ ID NO: 87           moltype = DNA  length = 22
FEATURE                 Location/Qualifiers
misc_feature            1..22
                        note = Primer for fungal detection
source                  1..22
                        mol_type = other DNA
                        organism = synthetic construct
SEQUENCE: 87
atccagtgtc tataatctgt ag                                       22

SEQ ID NO: 88           moltype = DNA  length = 44
FEATURE                 Location/Qualifiers
misc_feature            1..44
                        note = Primer for fungal detection
source                  1..44
                        mol_type = other DNA
                        organism = synthetic construct
SEQUENCE: 88
gagtcagttc gtatgctgtg agtttttaac agccaagagc aagc               44

SEQ ID NO: 89           moltype = DNA  length = 44
FEATURE                 Location/Qualifiers
misc_feature            1..44
                        note = Primer for fungal detection
source                  1..44
                        mol_type = other DNA
                        organism = synthetic construct
SEQUENCE: 89
cgcaacacag ggcaccaact tttgtgcagt atgtaagaag tggt               44

SEQ ID NO: 90           moltype = DNA  length = 19
FEATURE                 Location/Qualifiers
misc_feature            1..19
                        note = Primer for fungal detection
source                  1..19
                        mol_type = other DNA
                        organism = synthetic construct
SEQUENCE: 90
ggctactgag gaggtaggt                                           19

SEQ ID NO: 91           moltype = DNA  length = 20
FEATURE                 Location/Qualifiers
misc_feature            1..20
                        note = Primer for fungal detection
source                  1..20
                        mol_type = other DNA
                        organism = synthetic construct
SEQUENCE: 91
agaacagcac aaagagcaga                                          20
```

What is claimed is:

1. A method for detecting *Rhizoctonia solani* DNA in a turf grass sample with a loop-mediated isothermal amplification (LAMP) assay comprising:

subjecting the turf grass sample to a LAMP reaction with a primer set having primer sequences at least 90% identical to SEQ ID NO: 20, 21, 22 and 23; or with a primer set having primer sequences at least 90% identical to SEQ ID NO: 62, 63, 66 and 67.

2. The method according to claim 1, wherein the primer set for further comprises sequences which are at least 90% identical to SEQ ID Nos: 64 and 65.

3. The method according to claim 1, wherein the primer set further comprises sequences which are at least 90% identical to SEQ ID Nos: 24 and 25.

4. A kit for the detection of fungal DNA in a turf grass sample using a LAMP assay, comprising one or more than one of the primer sets identified in claim 1 associated with an indicator dye.

5. The kit of claim 4, further comprising a buffer, a DNA polymerase, or a combination thereof.

6. The method according to claim 1, wherein the primer set comprises primers identical to SEQ ID NOs: 20, 21, 22, and 23.

7. The method according to claim 1, wherein the primer set comprises primers identical to SEQ ID NOs: 20, 21, 22, 23, 24 and 25.

8. The method according to claim 1, wherein the primer set consists of primers 90% identical to SEQ ID NOs: 20, 21, 22, and 23.

9. The method according to claim 1, wherein the primer set consists of primers 90% identical to SEQ ID NOs: 20, 21, 22, 23, 24 and 25.

10. The method according to claim 1, wherein the primer set comprises primers identical to SEQ ID NOs: 62, 63, 66, and 67.

11. The method according to claim 1, wherein the primer set comprises primers identical to SEQ ID NOs: 62, 63, 64, 65, 66 and 67.

12. The method according to claim 1, wherein the primer set consists of primers 90% identical to SEQ ID NOs: 62, 63, 66, and 67.

13. The method according to claim 1, wherein the primer set consists of primers 90% identical to SEQ ID NOs: 62, 63, 64, 65, 66 and 67.

* * * * *